United States Patent [19]

Fukuoka

[11] 4,150,455
[45] Apr. 24, 1979

[54] METHOD FOR MANUFACTURING A FOOTWEAR AND FOOTWEAR

[76] Inventor: Tatsuo Fukuoka, 3,3 Ban, 2-chome, Shin-Minami-Fukushima Tokushima City, Japan

[21] Appl. No.: 800,733

[22] Filed: May 26, 1977

Related U.S. Application Data

[63] Continuation-in-part of Ser. No. 629,116, Nov. 5, 1975, and a continuation-in-part of Ser. No. 511,243, Oct. 2, 1974, Pat. No. 3,952,358, and a continuation-in-part of Ser. No. 402,967, Oct. 3, 1973, abandoned.

[30] Foreign Application Priority Data

Sep. 24, 1976 [JP] Japan .............................. 51/115169
Dec. 16, 1976 [JP] Japan .............................. 51/151613

[51] Int. Cl.$^2$ .......................... A43D 9/00; A43B 3/13; A43B 1/02
[52] U.S. Cl. ................................. 12/142 RS; 36/11.5; 36/84
[58] Field of Search ................... 36/11.5, 45, 46.5, 4, 36/14, 83, 84; 12/142 R, 142 E, 142 RS

[56] References Cited

U.S. PATENT DOCUMENTS

| | | | |
|---|---|---|---|
| 3,552,039 | 1/1971 | Fukuoka | 36/11.5 |
| 3,672,078 | 6/1972 | Fukuoka | 36/11.5 |
| 3,698,107 | 10/1972 | Fukuoka | 36/11.5 |
| 4,024,652 | 5/1977 | Brilli | 12/142 RS |

FOREIGN PATENT DOCUMENTS 1426776  9/1973  United Kingdom ..................... 36/11.5

*Primary Examiner*—Patrick D. Lawson

[57] ABSTRACT

A method for manufacturing an instep cover section of a footwear, comprising placing an instep cover member in a molding cavity, pressure-injecting molten synthetic resin material into the cavity, and thus connecting the synthetic resin material with the instep cover member whereby the synthetic resin material and the instep cover member form at least the main part of the three-dimensional instep cover section of a footwear. Also, a footwear comprises an upper including prefabricated members connected with resin sections.

3 Claims, 84 Drawing Figures

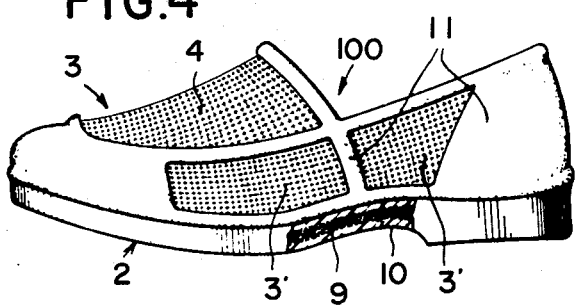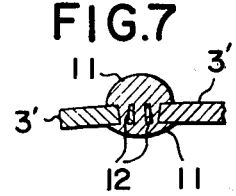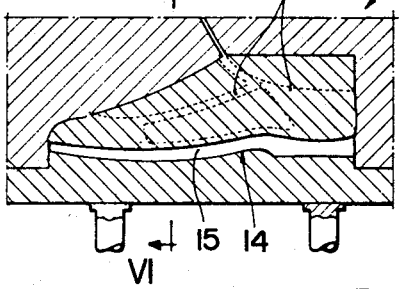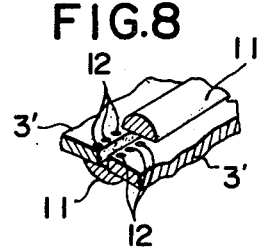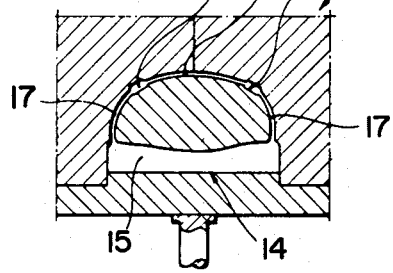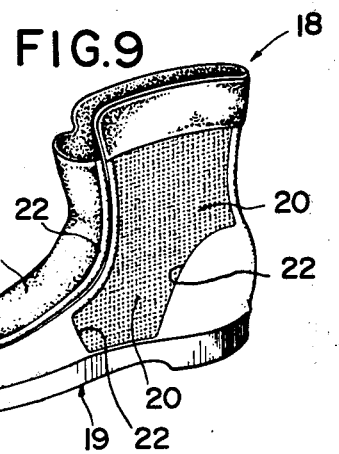

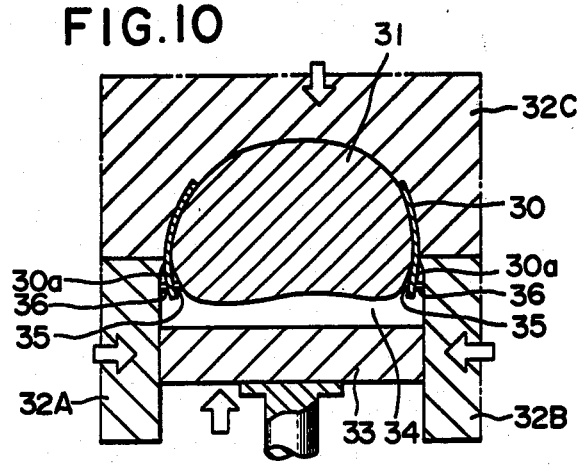
FIG.10
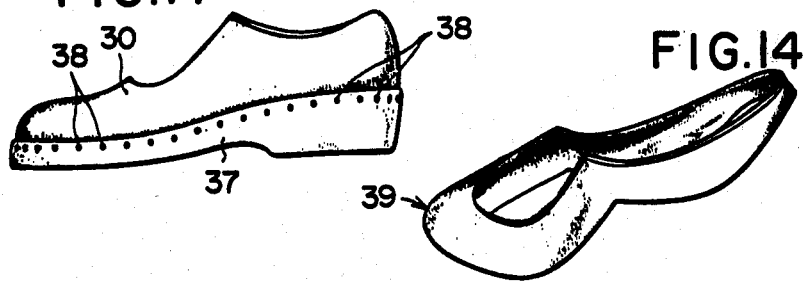
FIG.11
FIG.14
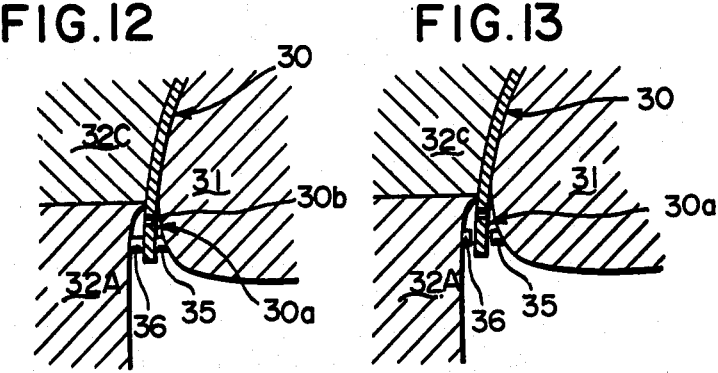
FIG.12 FIG.13

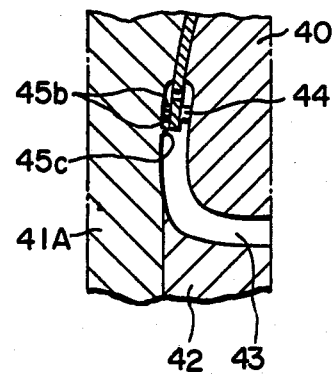
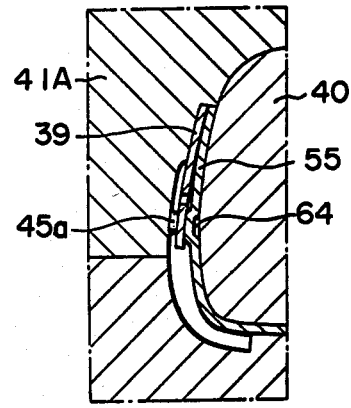
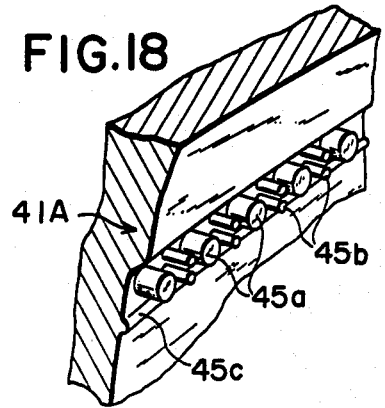
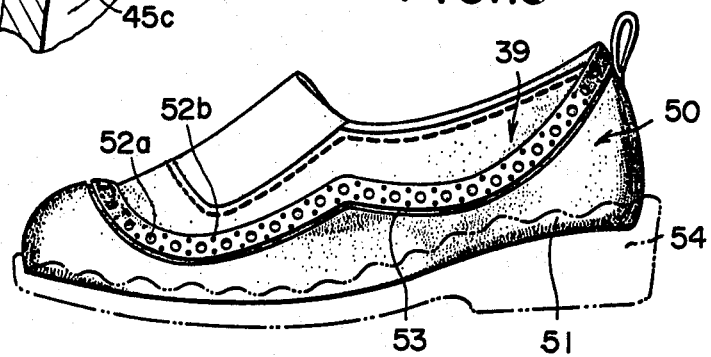

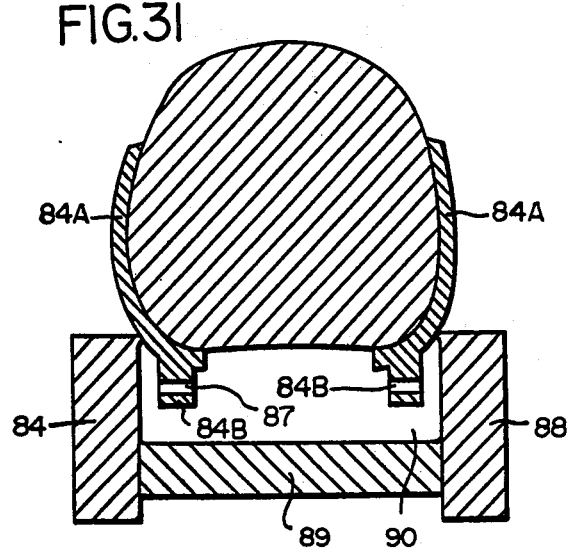
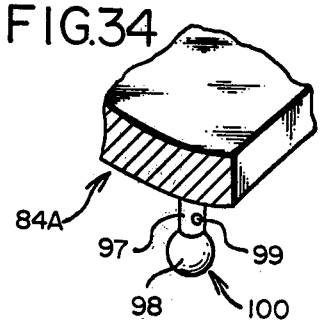
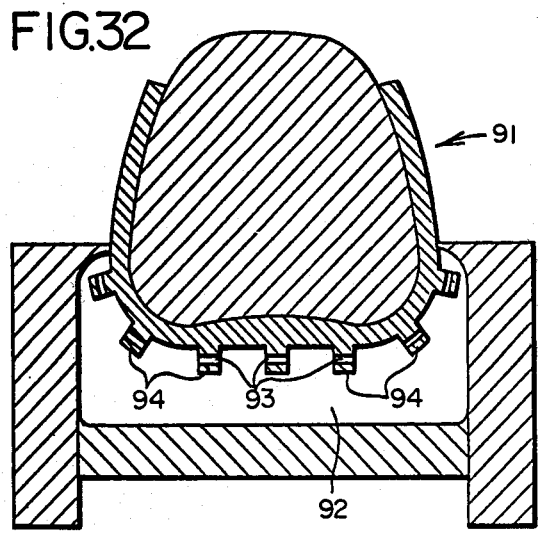

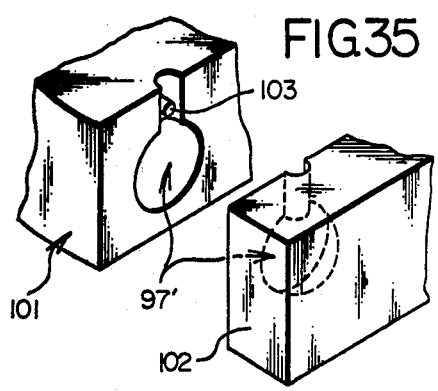
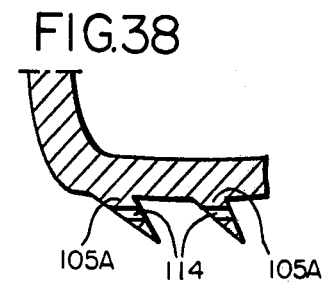
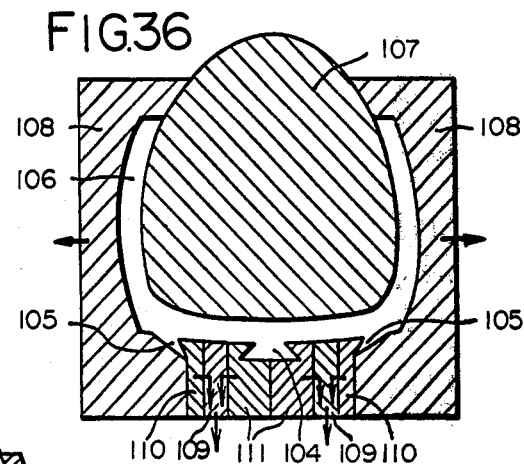
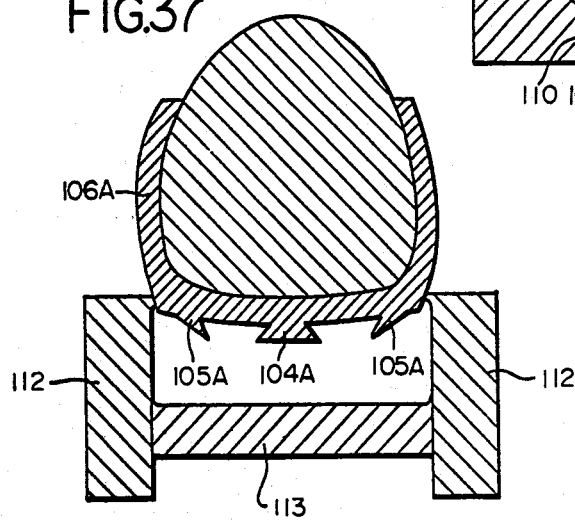

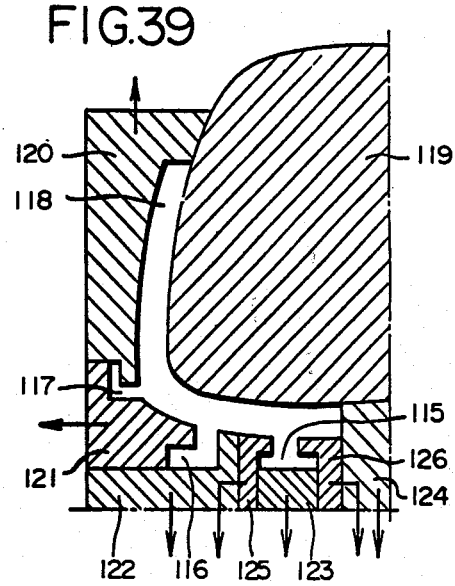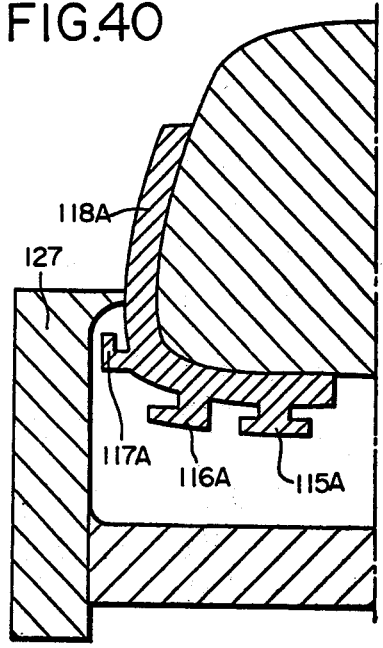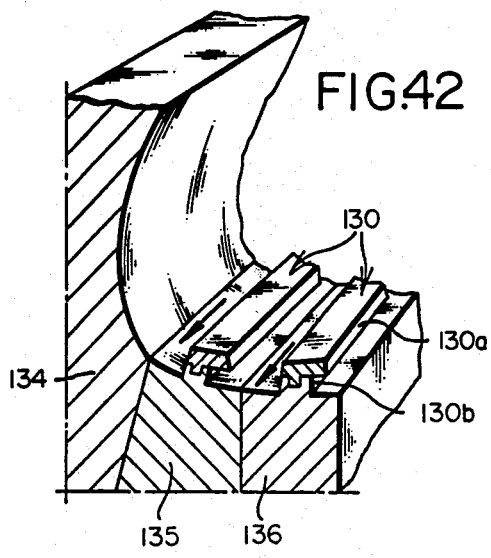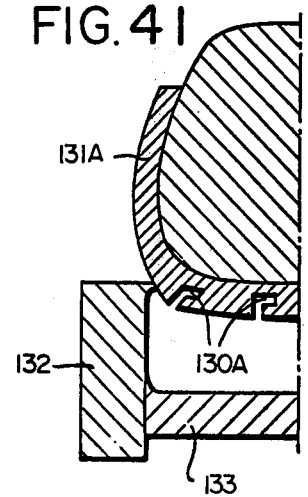

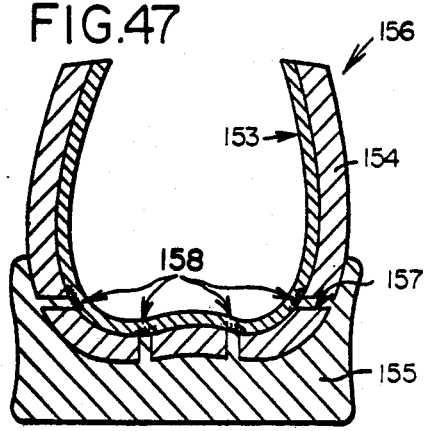
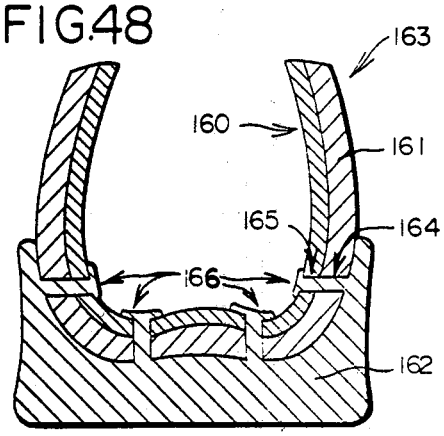
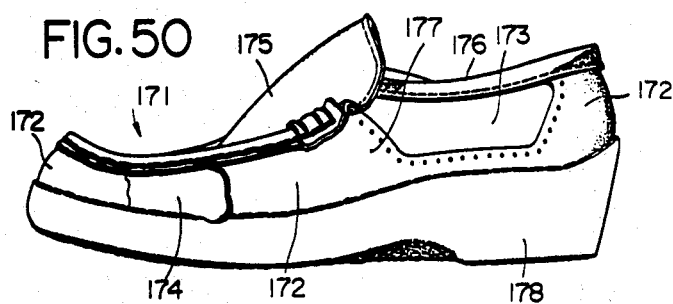
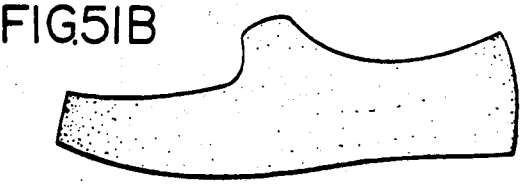
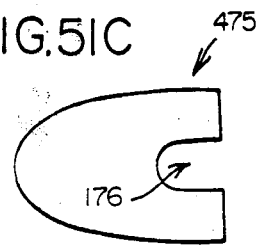

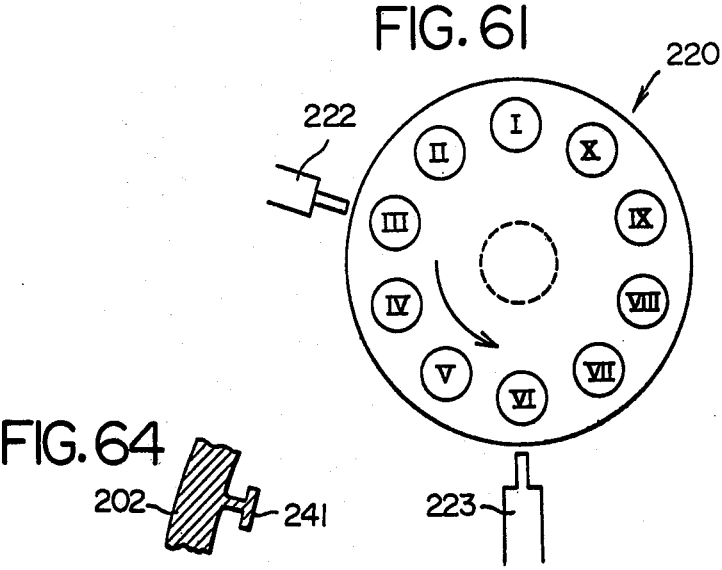
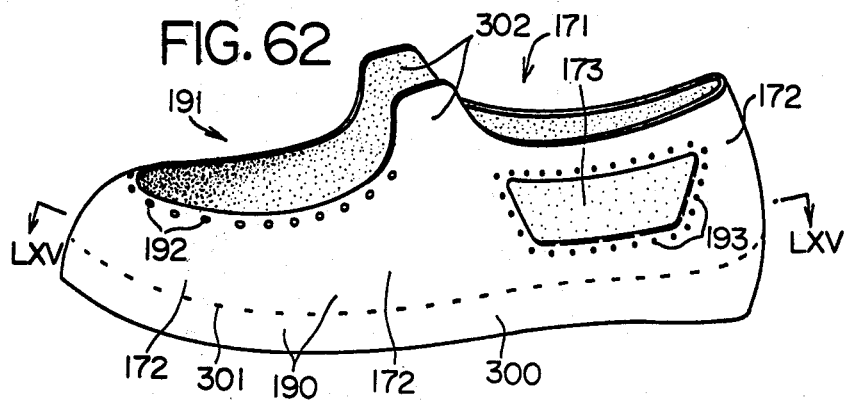

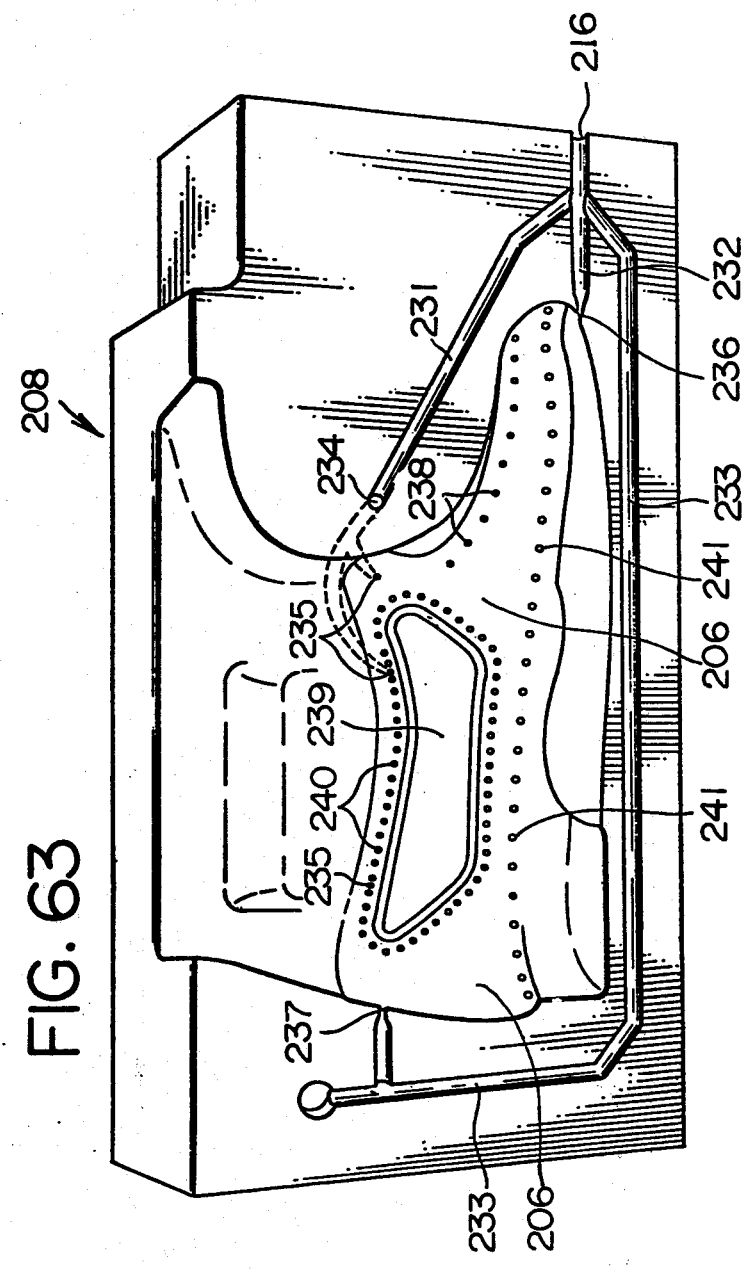

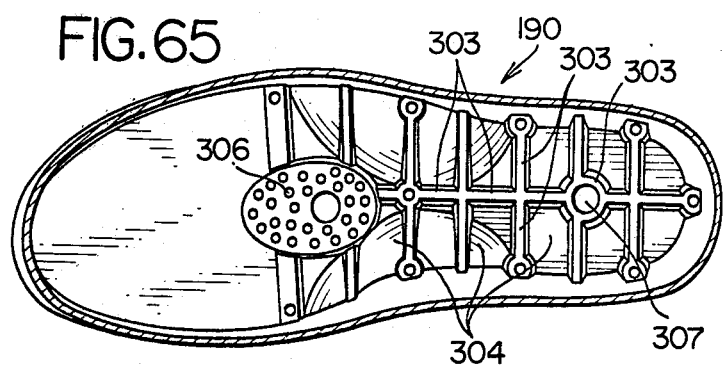
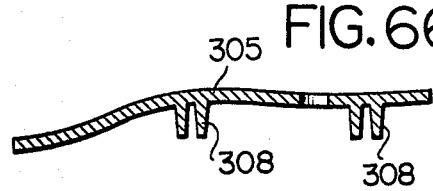
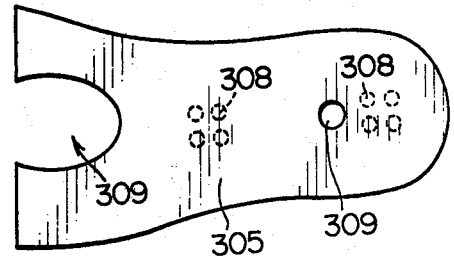
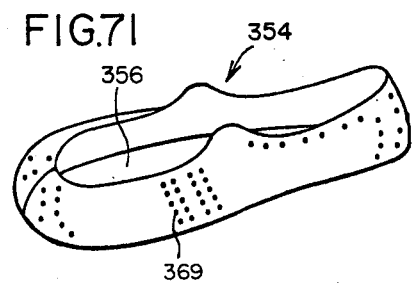

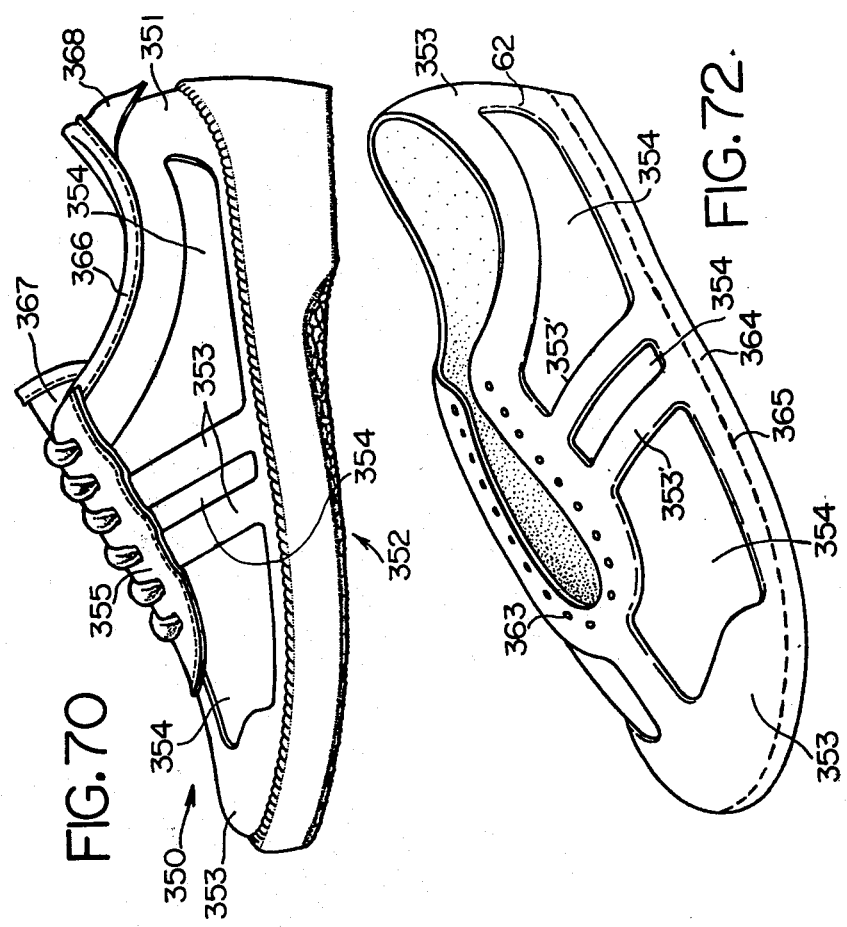

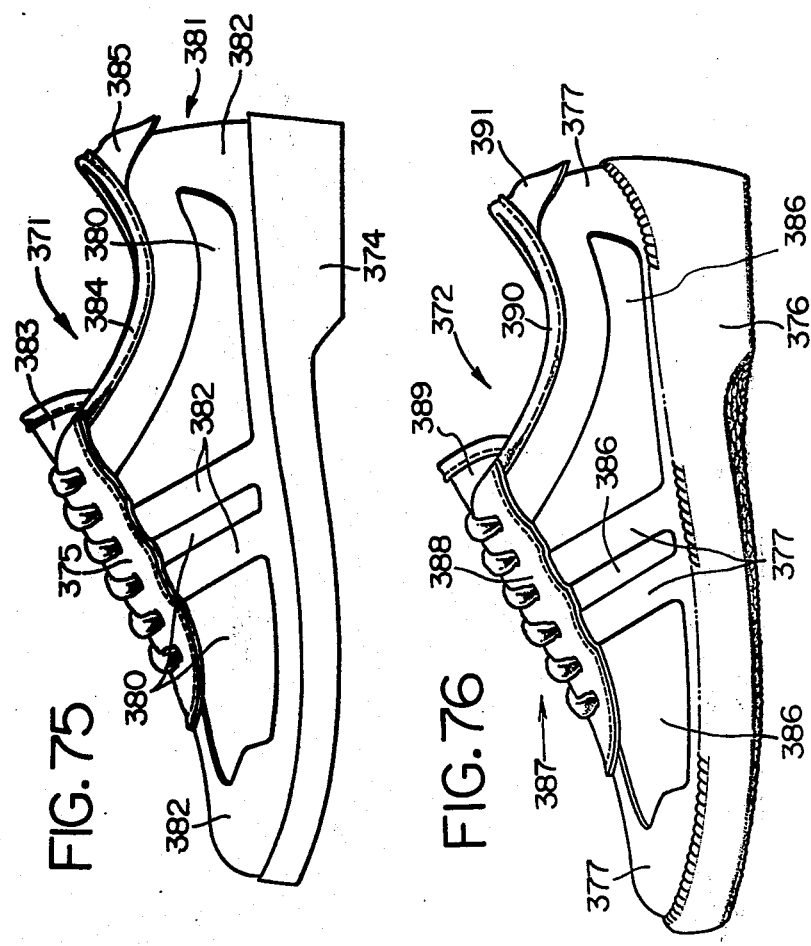

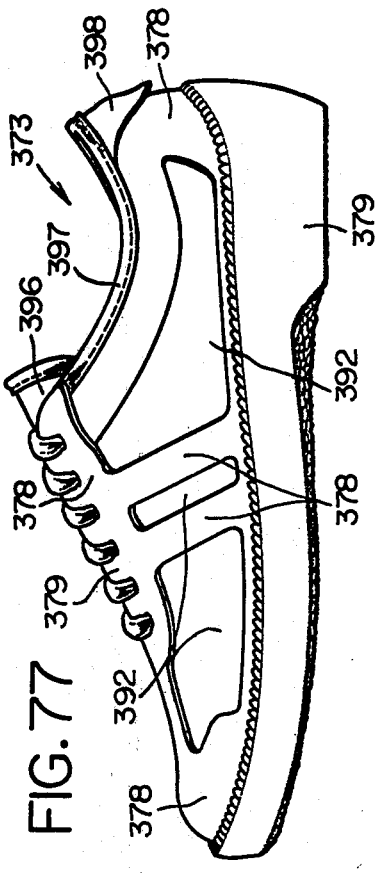
FIG. 77
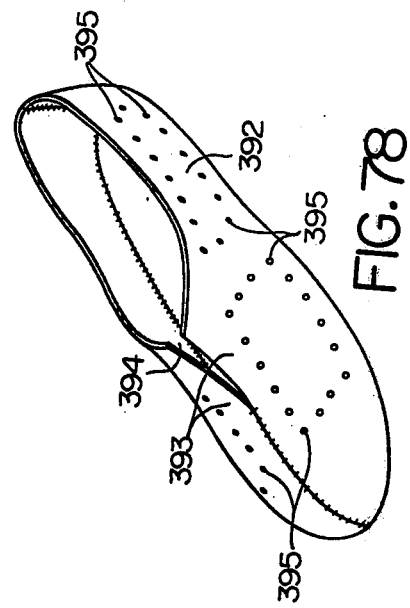
FIG. 78
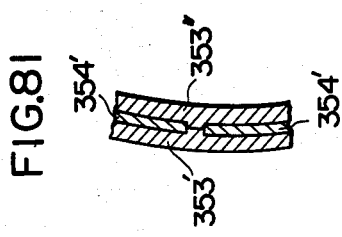
FIG. 79
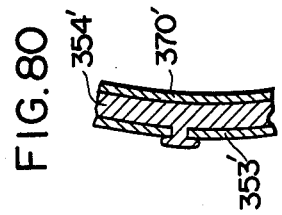
FIG. 80
FIG. 81

METHOD FOR MANUFACTURING A FOOTWEAR AND FOOTWEAR

RELATED APPLICATIONS

This application is a continuation-in-part application of my prior applications entitled "A Method For Manufacturing A Footwear", Ser. No. 629,116, filed Nov. 5, 1975, "Shoe And A Method For Manufacturing The Same", Ser. No. 511,243, filed Oct. 2, 1974, now U.S. Pat. No. 3,952,358, and "Footwear", Ser. No. 402,967, filed Oct. 3, 1973, now abandoned.

The present invention relates to an improved method for manufacturing a footwear and a footwear.

Particularly, the present invention relates to a method for manufacturing an instep cover section of a footwear, comprising placing an instep cover member preformed so as to constitute at least a part of the instep cover section such as an upper, a band, strap and the like in a molding cavity of a mold adapted to clamp-mold the instep cover member in a required three-dimensional shape by the close of the cavity itself and provided with a space into which synthetic resin material is flowed so as to contact with at least a part of the instep cover member, pressure-injecting molten synthetic resin material into the cavity when the instep cover member has been clamp-molded by closing the cavity, and thus connecting the synthetic resin material with the instep cover member whereby the synthetic resin material and the instep cover member form at least the main part of the three-dimensional instep cover section of a footwear.

Also, the present invention relates to a method for manufacturing a footwear, comprising placing an instep cover member preformed so as to constitute at least a part of an instep cover section such as an upper, a band, strap and the like in a molding cavity of a mold adapted to clamp-mold at least a part of the instep cover section and provided with a space for molding a sole into which synthetic resin material is injected, pressure-injecting molten synthetic resin material into the molding cavity when at least a part of the instep cover section is clamp-molded by closing the mold and thus connecting the synthetic resin material with at least a part of the said instep cover section whereby the instep cover section and the sole are integrally formed.

Preferably, the said instep cover member made of air-permeable material constitutes the main part of the instep cover section of the footwear and the synthetic resin material is flowed into the space of the cavity in such a manner that at least a reinforcing member is molded of the synthetic material on the outer surface of the instep cover member.

Further, the present invention relates to a footwear comprising an upper and a sole, the upper including one or more prefabricated members and being provided with one or more sections molded of resin material integrally connected with the prefabricated members during pressure-injecting molten resin material into a cavity within which the prefabricated members are placed. Preferably, the said sole is also integrally connected with the upper. Also, the present invention relates to a footwear comprising an upper and a sole, the upper including the main part prefabricated and at least a reinforcing member integrally molded of resin material on the outer surface of the main part of the upper during pressure-injecting molten resin material into a cavity within which the prefabricated members are placed.

The main object of the present invention set forth above is to largely minimize the much arts, skills, labors and times absolutely required for the subject manufacturing according to the conventional method, to improve the ventilation effect in footwears manufactured according to the present invention under presence of the air-permeable instep cover member, to three-dimensionally mold the main part of the instep cover section in the cavity thereby improving the appearance and comfortableness in use of the footwears thus manufactured, and to firmly connect the main part of the instep cover section with the remaining part thereof (or the sole).

Further, the present invention relates to a method for manufacturing an upper of a footwear wherein on a male mold for upper is mounted an upper base and resin material is pressure injected within an upper molding cavity whereby an upper portion of synthetic resin is molded on a required portion of the upper base. Further, according to the method a sole is integrally molded with the upper base or an upper.

The present invention relates to a method for manufacturing a footwear wherein an upper base is mounted on the male mold providing substantially vertical piston movement through a last, a divided female mold for upper is opened at a predetermined position within which is lowered and fixed said male mold, resin material for upper is injected into the upper molding cavity after closing said divided female mold for upper so as to mold an upper portion of synthetic resin at a required portion on said upper base, said divided female mold for upper is opened after cooling or hardening of said resin material whereafter said male mold is further transferred to and fixed at a predetermined position within said divided female mold for sole which is opened, and synthetic resin material for sole is injected within a sole molding cavity after closing said divided female mold for sole so as to mold a sole integrally with the upper base or an upper.

The said upper base is molded of material different from resin material, that is, natural or artificial (synthetic) leather, woven fabric, non-woven fabric, knitted fabric, fur, felt or the like. The materials should provide air permeability and be applicable as an outer layer material for shoe upper and also be adapted to improve shape retainability and reinforcement of the shoe upper and agreeableness in use of the molded shoe.

An object of the present invention is to provide a method for manufacturing a footwear, the upper base of which defining substantially the main part of an upper is formed from the said material, the upper portion of synthetic resin of which is molded by injecting synthetic resin material to a main portion or a required portion on said upper base, said upper portion being molded is superior in shape retainability to leather or cloth whereby the integrality of the upper base and the upper portion of synthetic resin by the method of the present invention not only provides the upper with a curved face in three-dimension along an instep of a foot but also strengthen the shape retainability and the reinforcement of the upper.

During pressure molding the synthetic resin material on the upper base by the method according to the present invention, it is advantageous that the upper base comprises a material permeable for synthetic resin. The said air permeability for synthetic resin means that the molten synthetic resin material permeates to the surface or among the fabric structure of the upper base by the pressure within the molding cavity and by temperature or liquidity of the synthetic resin material when the molten synthetic resin material for shoe is pressure injected within the air-tight molding cavity within which the upper base is mounted on the male mold for shoe. When the molten compound permeating within the upper base is hardened, the upper base and the upper portion of synthetic resin integrally connect with each other within the molding cavity without any particular means whereby the reinforcement, shape retainability and durability of the upper are effected.

If small holes passing through the upper base are previously defined at required positions thereof the molten resin material will pass through said holes to leak out the inside of said upper base when the upper portion of synthetic resin is molded whereby the upper base is clamped by the upper portion of synthetic resin through said holes after hardening of said resin material so as to obtain the strong integral coherence between the upper base and the upper portion of synthetic resin.

Furthermore, for ensuring further integrality of the upper base with the upper portion of synthetic resin, conventional adhesive such as urethane, vinyl acetate or the like may be previously applied on the portion of the upper base before the upper portion of synthetic resin is molded.

Further, according to the present invention, the molten synthetic resin material is pressure injected under the condition of mold closing and the closing pressure of a mold for injection molding is no less than several hundreds kg/cm$^2$. In consideration of the above, said mold is heated by the molten resin material being pressure injected whereby in case of whatever complicate curved surface in three dimensions of the upper, the upper base can be pressure molded into a curved surface in three dimensions along the instep extremely easily and rapidly without any high technique and further effectively and accurately without any deformation.

The upper base is made of material being applicable as an outer layer material for the upper, for example an air permeable material having a commercial value in dignity, such as suede, felt, synthetic or natural leather, or cloth.

Further, as mentioned above the durability of the molded shoe is further strengthened since the upper portion of synthetic resin of the upper base has the superior shape retainability.

On the other hand, in case that the upper base is made of a material not applicable as an outer layer material for the shoe upper, the upper portion of synthetic resin may be molded on almost the whole surface of said upper base. In said case, however, there will be a problem in air permiability of the shoe. In this connection, the present invention gives a method for providing the shoe with air-permiability by previously fixing on the upper base a permeable outer layer member for upper which forms a part of the outer layer of the upper.

That is, on said upper base is connected the air-permeable upper layer member for upper and the upper portion of synthetic resin is molded on the other portion of the upper base than said outer layer member for upper and on the periphery of said outer layer member for upper so that air-permeation is effected on the shoe by means of the outer layer member for upper. In this case the upper base is of course required to have air-permeation. The outer layer member for shoe is preferably made of air-permeable material of high commercial value as outer layer material for the upper, for example such as natural leather, synthetic leather or cloth.

Meanwhile, the portion of the upper base on which the outer layer member for upper is to be mounted may be previously cut away except for the portion of the upper base corresponding to the periphery of the outer layer member for upper. In said case, the outer layer member cab ne maintained on the shoe upper by being clamped at the periphery thereof with the upper base and the upper portion of synthetic resin. Another advantage resulted from mounting the outer layer material for upper on the upper base is a decorative effect on the shoe.

Two-shots molding of the upper and the sole with different synthetic resin compositions is obtained by connecting the upper with the sole by adhesive agent or stitch after molding the upper and the sole respectively in the different molding cavity, or by the method that after molding the upper of synthetic resin, the upper is fixed at a predetermined position within the sole molding cavity and thereafter the upper is welded or pressure fixed to the sole. However, by either method mentioned above, through the integral molding of the shoe is easily obtained, the upper and the sole are pressure fixed with each other at the plane surfaces thereof, whereby the upper is easily separated from the sole after a long term use of the shoe.

In this connection, according to the present invention, when the upper portion of synthetic resin is molded by the latter method above, a plurality of recesses or projections are formed on required portions of the surface to be connected of the upper portion with the sole so that the molten resin material for sole flows within said recesses or said projections protrude within the sole portion of synthetic resin during molding the sole so as to define an engaging portion or a hooking portion on the surface to be connected of the upper with the sole, whereby the firmer coherence of the upper to the sole is effected. In some case, the said recesses or projections are formed on required portions of the surface to be connected of the sole portion with the upper portion.

Another object of the present invention is to provide a shoe manufacturing apparatus which has a higher efficiency than the conventional apparatus and remarkably improves the productivity of the shoe.

The construction of the shoe manufacturing apparatus of the present invention is as follows.

The divided female mold for upper and the divided female mold for sole are integrally and vertically fixed with each other so that the respective positions of the upper molding cavity and the sole molding cavity correspond with each other, one male mold to said two female molds being disposed at the upper part of said two female molds and being adapted to be subject to substantially perpendicular piston movement through the last so as to be transferred to a predetermined position within said respective female molds.

Due to the above-mentioned construction of the shoe manufacturing apparatus according to the present invention, the process for manufacturing the shoe of synthetic resin is remarkably simplified, while the shoe is accurately and rapidly manufactured whereby productivity of the shoe is extremely increased.

Further, the said apparatus is also applicable to a method for manufacturing footwears without the upper base manufactured by the method of present invention, the upper and the sole of which are molded with the different synthetic resin materials.

Furthermore, a plurality of the shoe manufacturing apparatus of the present invention are concentrically arranged being equally spaced apart with one another while the driving means are mounted thereon for revolving said whole plurality of apparatus to the direction of order so that said plurality of the apparatus can be effectively utilized according to the respective working steps of the apparatus, whereby the shoe manufacturing apparatus of higher efficiency can be obtained.

Namely, the plurality of working steps in manufacturing the shoe including the upper base of the present invention are as follows.

The 1st step: The upper base is mounted on the male mole for shoe.

The 2nd step: Said male mold is lowered and fixed at a predetermined position within the divided female mold for upper and is closed to define the upper molding cavity.

The 3rd step: The synthetic resin material for upper is pressure injected within the upper molding cavity.

The 4th step: The upper portion of synthetic resin is cooled.

The 5th step: The female mold is opened and thereafter said male mold is transferred to and fixed at a predetermined position within the opened female mold for sole and is closed to define the sole molding cavity.

The 6th step: The synthetic resin material for sole is pressure injected into the sole molding chamber.

The 7th step: The sole portion of synthetic resin is cooled.

The 8th step: The female mold for sole is opened and thereafter the molded shoe of synthetic resin is removed from said male mold.

Thus, in case the shoe is molded of synthetic resin material by 8 working steps, 8 shoe manufacturing apparatuses of the present invention are equally spaced apart and concentrically arranged.

Each of said eight steps is corresponded in order to each of the positions disposed said eight apparatuses and the driving means rotates the whole eight apparatuses by the distance between two adjacent apparatuses to the direction according to the working process when said eight apparatuses finish their respective works of steps. The work of the first step is performed by the apparatus having been rotated at the position where the work of the first step should be performed, and thereafter the whole eight apparatuses are rotated to the direction of order by one step, whereby said apparatus performs the work of the second step at the position of the second step and the following apparatus performs the work of the first step. Further, the whole apparatuses are rotated by one step, the first apparatus perfoms the work of the third step, the following apparatus does that of the second step and the secondary-following apparatus does that of the first step. Thus, the repetition like the above makes one apparatus perform the works of the steps predetermined according to their positions at respective positions in order, whereby shoes are efficiently manufactured.

The above process of eight steps is just only one example, so the number of steps is not restricted and is properly determined according to required manufacturing process and manufacturing efficiency, for example, labour and time required for every step.

For example, in case that in the 7th step is required a considerable time for cooling the sole of synthetic resin, the more, for example, 3 apparatuses for performing the work of the 7th step may be provided for preventing the other apparatuses from being free from work during the 7th step. The number of apparatuses is determined like this. Thus, the subject shoe manufacturing apparatus can be time-controlled and economized in labour.

The subject apparatus will be understood the more concretely in the undermentioned embodiments.

Further, the synthetic resin material for molding shoes for the subject invention is obtained by adding plasticizer, stabilizer, colouring agent, rubber, blowing agent or other conventional additives to conventional synthetic resin applicable to footwears of synthetic resin, for example, vinyl chloride resin, ethylene acetate copolymer resin, polyurethane resin.

The advantages and effects of the method of shoe manufacturing and the apparatus therefor are as follows:

(1) The labour and high level skillful technique required for the conventional manufacturing of shoe made of leather or cloth can be extremely saved; and the manufacturing will be simple and accurate.

(2) Various designs can be applied to the shoe upper together with high dignity since the shoe upper is molded by the combination of the upper of synthetic resin and the different material from said synthetic resin.

(3) The sufficient air-permiability is effected in spite of the shoe of synthetic resin since a part of the outer layer of the upper is formed of air-permeable material.

(4) The shape retaining effect, the reinforcement and the durability of the molded shoe are remarkably improved since the upper is molded of synthetic resin material of superior shape retaining effect.

(5) The shoe is much light since it is molded of synthetic resin material and further the shoe is also provided with air-permeability without causing fatique to the foot whereby the shoe is comfortable to wear.

(6) In spite that the upper portion of synthetic resin and the sole portion of synthetic resin are by two-shots moldings, stronger integrality of said both is effected than in case of the conventional two-shots moldings.

(7) The shoe manufacturing apparatus of the present invention is extremely efficient in the working process thereof so that the productivity of the shoe of synthetic resin is remarkably improved.

The other methods, apparatus and footwears according to the present invention will be more apparent as well as the other objects, effects and advantages from the following detailed description of the embodiments with reference to the appended drawings.

FIG. 4 is a front view of a shoe according to the present invention;

FIG. 5 is a sectional view of the main part of a mold for molding the shoe of FIG. 4;

FIG. 6 is a sectional view taken along the line VI—VI in FIG. 5;

FIG. 7 is a sectional view of a connecting member according to the present invention;

FIG. 8 is a partly cut-away perspective view of the connecting member of FIG. 7;

FIG. 9 is a perspective view of a half boot according to the present invention;

FIG. 10 is a sectional view of a mold assembly for molding a shoe as shown in FIG. 11;

FIG. 11 is a front view of the shoe according to the present invention;

FIG. 12 is a partly enlarged section of the main part of the mold assembly of FIG. 10;

FIG. 13 is a section similar to FIG. 12, but projections not being in contact with the protrusions;

FIG. 14 is a perspective view of the upper of the shoe in FIG. 11;

FIG. 17 is a partly enlarged view of the main part of the mold assembly of FIG. 16;

FIG. 18 is a perspective view of the part in FIG. 17;

FIG. 19 is a front view of a shoe according to the present invention;

FIG. 20 is a sectional view of the main part of the mold assembly modified from that in FIG. 17 wherein a lining is mounted on the mold assembly;

FIG. 31 is a cross section of a mold assembly for molding a sole set onto the upper molded by the mold assembly in FIG. 28;

FIG. 32 is a cross section of a mold assembly modified from the assembly in FIG. 31 wherein the upper previously molded is modified from the upper of FIG. 31;

FIG. 34 is an enlarged perspective view of a projection protruded from an upper modified from those of the upper in FIG. 31;

FIG. 35 is an enlarged perspective and exploded view of some molds for molding the projection in FIG. 34;

FIG. 36 is a cross section of a mold assembly for molding an upper modified from that in FIG. 38;

FIG. 37 is a cross section of a mold assembly for molding a sole set onto the upper molded by the assembly in FIG. 36;

FIG. 38 is an enlarged and partial cross section of projections protruded from an upper modified from those in FIG. 37;

FIG. 39 is a cross section of a mold assembly for molding an upper modified from that in FIG. 36;

FIG. 40 is a cross section of a mold assembly for molding a sole set onto the upper molded by the assembly in FIG. 39;

FIG. 41 is a cross section of the left part of a mold assembly for molding a sole set onto an upper modified from that in FIG. 40;

FIG. 42 is a perspective view of the main part of a mold assembly for molding the upper in FIG. 41;

FIG. 47 is a cross section of the connection between an upper provided with a lining and a sole according to the present invention;

FIG. 48 is a cross section of the connection between an upper provided with a lining and a sole modified from that in FIG. 47;

FIG. 50 is a front view of a shoe according to the present invention;

Figure 55:
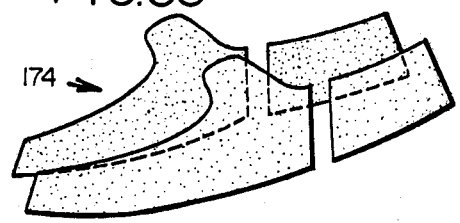
Figure 52:
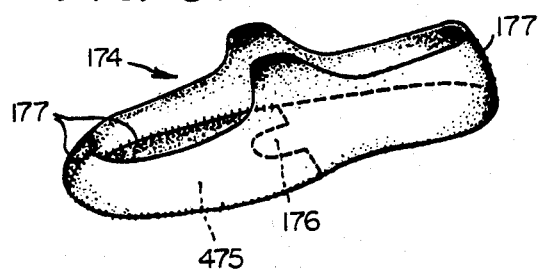
Figure 56:
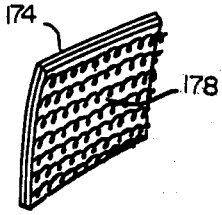
Figure 53:
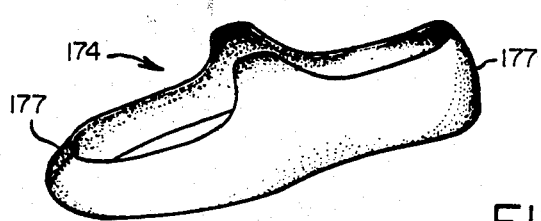
Figure 54:
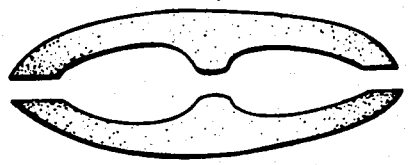
Figure 57:
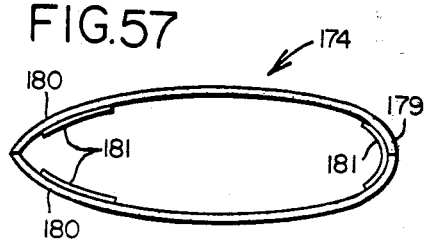
Figure 58:
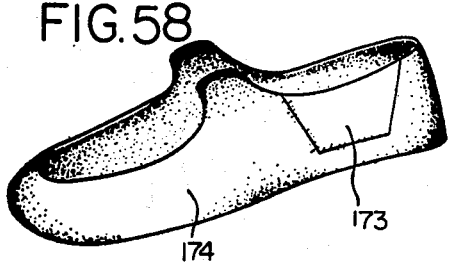
Figure 59:
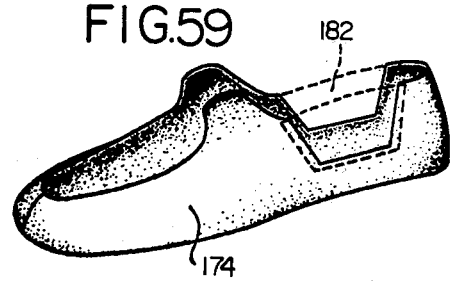
Figure 60:
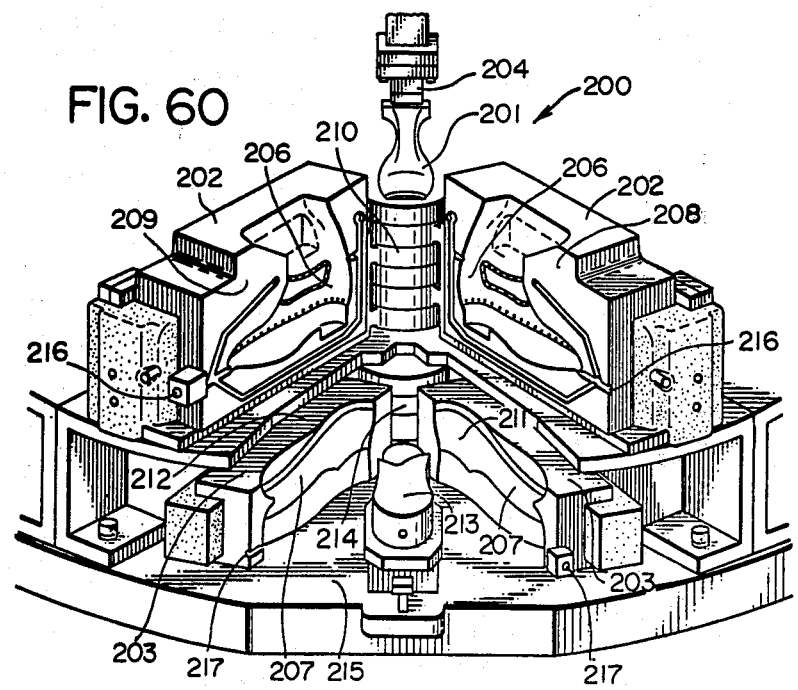
Figure 67:
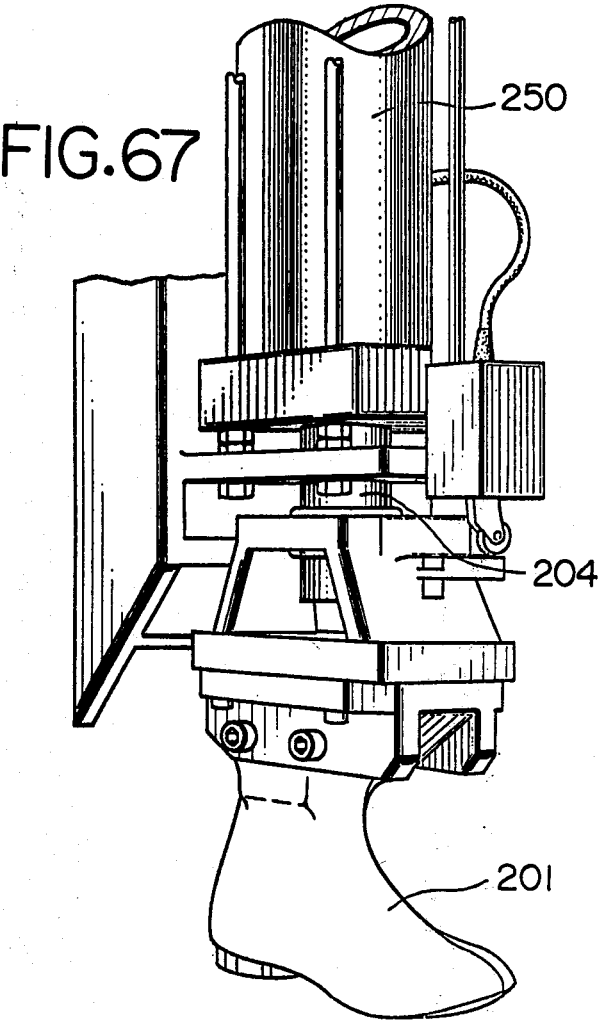
Figure 73:
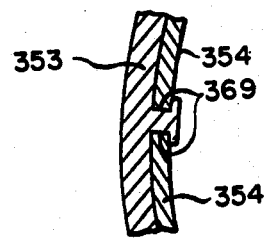
Figure 74:
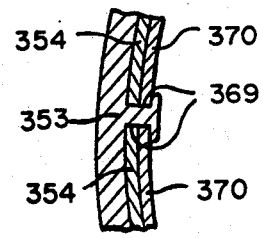
Figure 68:
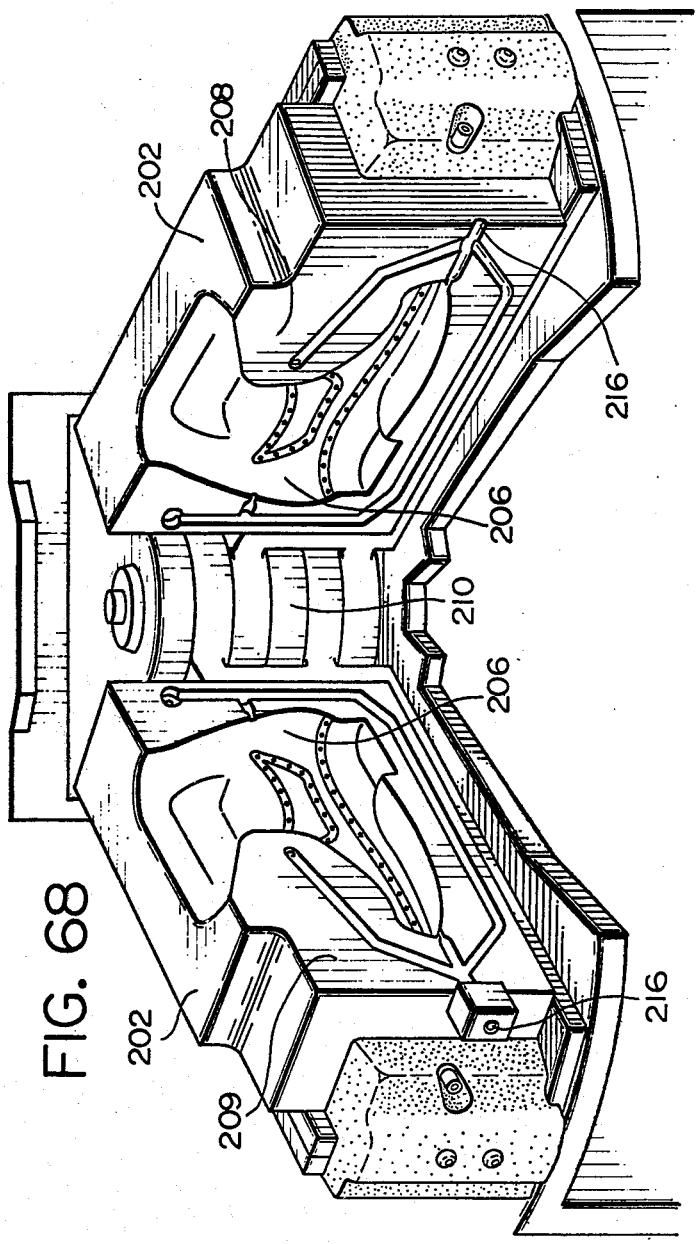
Figure 69:
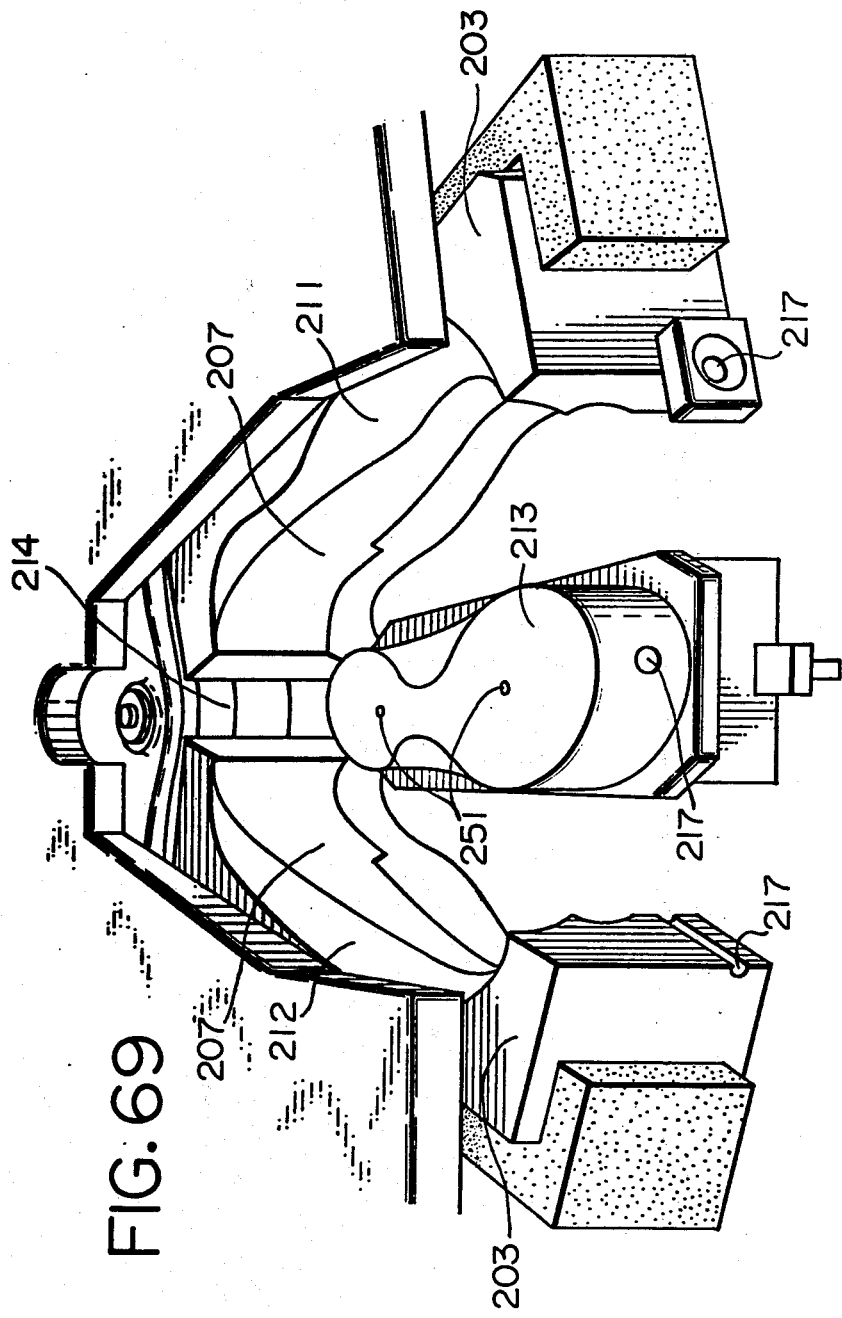

FIGS. 51 A, B and C are views for explanating sections of an upper base according to the present invention, respectively;

FIG. 52 is a perspective view of the upper base;

FIG. 53 is a perspective view of an upper base modified from the base in FIG. 52;

FIG. 54 is a plan and exploded view of a pair of sections of the upper base in FIG. 53;

FIG. 55 is a perspective view of a pair of sections of the upper base;

FIG. 56 is a perspective view of a part of an upper base modified from that in FIG. 52;

FIG. 57 is a plan view of an upper base provided with cushioning members according to the present invention;

FIG. 58 is a perspective view of an upper base provided with air-permeable section according to the present invention;

FIG. 59 is a perspective view of an upper base provided with cut-away sections;

FIG. 60 is a perspective view of a shoe molding apparatus according to the present invention;

FIG. 61 is a plan view of diagram of the apparatus of FIG. 60;

FIG. 62 is a perspective view of an upper integrally provided with an insole the shoe produced by the apparatus in FIG. 60;

FIG. 63 is a perspective view of a divided mold of a divided female mold of the apparatus in FIG. 60;

FIG. 64 is a cross section of a projection provided on the divided mold in FIG. 63;

FIG. 65 is a cross section taken along the line LXV—LXV in FIG. 62;

FIGS. 66 A and B are a cross section of a reinforcing cover applicable to the insole in FIG. 65 and a plan view thereof, respectively;

FIG. 67 is a perspective view of a male mold of the apparatus in FIG. 60;

FIG. 68 is a perspective view of divided female molds of the apparatus of FIG. 60;

FIG. 69 is a perspective view of divided female molds for molding a sole of the apparatus in FIG. 60;

FIG. 70 is a front view of a shoe according to the present invention;

FIG. 71 is a perspective view of an upper base of the shoe in FIG. 70;

FIG. 72 is a perspective view of an upper of the shoe in FIG. 70;

FIG. 73 is an enlarged cross section of some part of the combination the upper base and synthetic resin outer layer sections of the upper in FIG. 72;

FIG. 74 is a cross section of the part of the combination further modified from that in FIG. 73 wherein a lining is added thereto;

FIG. 75 is a front view of a shoe modified from that of FIG. 70;

FIG. 76 is a front view of a shoe further modified from that of FIG. 70;

FIG. 77 is a front view of a shoe also modified from that of FIG. 70;

FIG. 78 is a perspective view of an upper base of the upper of the shoe in FIG. 77;

FIG. 79 is an enlarged cross section of the part of the combination modified from that in FIG. 73;

FIG. 80 is an enlarged cross section of the part of the combination modified from that in FIG. 73; and FIG. 81 is an enlarged cross section of the part of the combination further modified from that in FIG. 73.

EMBODIMENT 1

Figure 1:
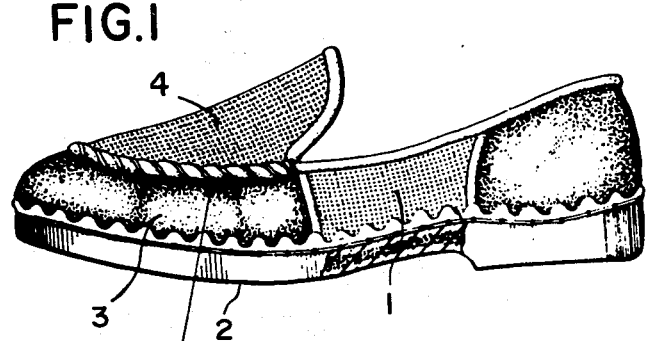
FIG. 1 is a front view of a shoe according to the present invention.

Referring to FIG. 1, intermediate sections 1, 1 are temporarily secured to or mounted on the inside of a mold within a molding cavity. The said sections are made of air-permeable material. Molten resin is injected into a sole-forming chamber and a lateral side section-forming chamber, whereby a sole 2 and a lateral side section 3 are integrally molded, and at the same time edges of the intermediate sections 1 are welded to edges of the lateral side section and upper edge of the sole. In some case, an upper vamp section 4 is, similar to the intermediate sections 1, temporarily secured or mounted inside the mold with the molding cavity and welded to the upper edge of the lateral side section 3.

Figure 2:
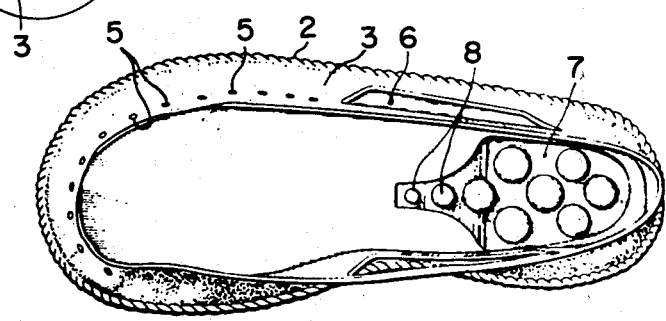
FIG. 2 is a plan view of a shoe excluding an upper vamp section according to the present invention.
Figure 3:
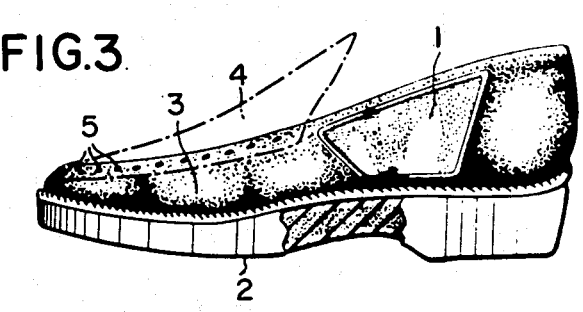
FIG. 3 is a front view of the shoe as shown in FIG. 2.

Shoes of the said construction have the following advantages. First, an air-permeable effect is given to the lateral side section 3 of the upper by making the sections 1 air-permiable. Further, the intermediate sections 1 give the wearer's foot relaxation from the pressure by the top cap section and the counter section made of synthetic resin material, whereby the shoes are more comfortable to wear. Referring to FIGS. 2 and 3, a sole 2 is molded of hard vinyl chloride, polyurethane or thermoplastic synthetic rubber in a molding cavity for the first molding in a metallic mold, and within 10 seconds thereafter, a lateral side section 3 of upper is molded of hard vinyl chloride, polyurethane or thermoplastic synthetic rubber in a cavity for the second molding obtained by modifying of said first cavity whereby the soft sole 2 and the hard lateral side section 3 of upper can be integrally formed.

Further, in said molding, by mounting or temporarilly attaching at a required position of said cavity of the mold an upper vamp section 4 of natural or synthetic leather, or natural or synthetic fiber or the like, said upper vamp section is connected to the lateral side section 3 by making use of fusion of vinyl chloride, polyurethane or synthetic rubber. In case of the upper vamp section of leather or the like, a number of openings 5 are provided that molten material can penetrate into said openings.

A cover section 1 covering a cut-away portion 6 of the lateral side section 3 of upper is temporarily attached in the required position of the molding cavity similarly to said upper vamp section 4, and connected to the lateral side section 3 by said molding.

| Composition for sole material | | | |
|---|---|---|---|
| hard ethylene-vinyl-acetate copolymer resin | copolymer resin including 15% of vinylacetate | 100 | parts |
| | foaming agent (azodicarbonaide) | 0.7 | parts |
| Composition for upper material | | | |
| soft ethylene-vinyl-acetaye copolymer resin | copolymer resin including 30% of vinylacetate | 100 | parts |
| | foaming agent (azodicarbonaide) | 0.7 | parts |

A method and apparatus, modified from those as disclosed in U.S. Pat. No. 3,671,621, may be used in manufacturing the said shoes.

Methods and apparatus developed by Desma-Werke GmbH in Federal Republic of Germany being famous in offering DESMA 702, DESMA 608+609, DESMA V810, DESMA 703/704 and DESMA 700 M are also applicable thereto.

A sole is molded of said material together with a lateral side section of upper of said material under the same step or under the different steps while the upper per se may be molded together with the sole. An integrated sole and lateral side section formed of two kinds of material is obtained.

As described above, according to the present invention, by a series of operations an integrated sole and lateral side section of upper or a shoe formed of two kinds of material can be economically and successively manufactured, in which the sole portion is formed, e.g., of relatively durable first material while the lateral side section is formed, e.g. of relatively soft second material.

By making some modification of the apparatus as required and providing three or more nozzles, an integrated sole and lateral side section or a shoe formed of three or more kinds of material can be manufactured according to the present invention.

Referring to FIG. 2, shown are recesses 7 and cylindrical cushioning members 8 extending from the recesses 7.

When molding the lateral side section including or not including the upper vamp section as shown in the preferred drawings among those explained heretobefore, the conventional material for lining or backing may be previously positioned at some place within the cavity of the mold and then material being bound to the inside of the lateral side section at the same time with the subject molding or may be fixed to the inner faces of the lateral side section after the molding.

The ones preferable among methods according to the present invention are set forth below.

1. A method for manufacturing an instep cover section of a footwear, comprising placing an instep cover member preformed so as to constitute at least a part of the instep cover section e.g. an upper, a band, a strap or the like in a molding cavity of a mold adapted to clamp-mold the instep cover member in a required three dimensional shape by the close of the cavity itself and provided with a space into which synthetic resin material is flowed so as to contact with at least a part of the instep cover member, pressure-injecting molten synthetic resin material into the cavity when the instep cover member has been clamp-molded by closing the cavity, and thus connecting the synthetic resin material with the instep cover member whereby the synthetic resin material and the instep cover member form at least the main part of the three-dimensional instep cover section of a footwear.

2. A method for manufacturing a footwear, comprising placing an instep cover member preformed so as to constitute at least a part of an instep cover section e.g. an upper, a band, a strap or the like in a molding cavity of a mold adapted to clamp-mold at least a part of the instep cover section and provided with a space for molding a sole into which synthetic resin material is injected, pressure-injecting molten synthetic resin material into the molding cavity when at least a part of the instep cover section is clamp-molded by closing the mold and thus connecting the synthetic resin material with at least a part of the said instep cover section whereby the instep cover section and the sole are integrally formed.

An example of a composition used for the said method is set forth below.

A resin composition of non-rigid foamed vinyl chloride resin:

| Vinyl chloride | 100 parts |
|---|---|
| plasticizer (D.O.P.) | 80 parts |
| stabilizer (OF-14 by Adeka Aagas Co., Ltd.) | |
| foaming agent (Azodicarbon amide) | 0.5 parts |

An example of molding conditions is set forth below.

| molten resin temperature | 170°–180° C. |
|---|---|
| clamping pressure | 70–150 kg/cm$^2$ |
| injecting pressure | 50–140 kg/cm$^2$ |
| cooling time | about 30 minutes |
| mold temperature | 80°–100° C. |
| injecting time | 1–1⅜ second |

The said conditions are also applied when E.V.A. resin is used.

A footwear, slipper or the like is manufactured by the said methods, using the said resin composition under the said conditions. One of such examples is as follows.

In FIGS. 4 to 6, there is illustrated a shoe comprising a sole 2 molded of thermoplastic or thermosetting resinous material (the preferred examples are vinyl chloride resin, polyurethane resin and the like) and having an upper surface smoothly undulated substantially along the profile of the wearer's footsole, and an upper 3 composed of upper sections and a shape-retaining and connecting means for connecting the adjacent sections to one another. The sole 2 comprises a foamed inner layer 9 and a non-foamy outer layer 10 completely surrounding said foamed inner layer, the boundary between the two layers being visible or invisible. The sole may be formed of, for example, vinyl chloride, plasticizer, vesicant, stabilizer, lubricating material, coloring agent and others. The sole is constructed such that the average particle diameter of the bubbles is successively larger from the surface towards the center throughout the non-foamy outer layer and the foamed inner layer. The surface of the sole has a shape wherein the peripheral edge portion and shank is raised while the toe portion and the heel portion are recessed from said raised portion of the peripheral edge. The recesses of the heel portion and the toe portion communicate with each other through a generously recessed portion along the shank portion.

The upper comprises a toe cap section, counter section, intermediate sections 3' between the preceding two sections and an upper vamp section 4. These sections are inseparably connected to one another at the adjacent edges thereof by means of a shape-retaining and connecting member 11 protruding from the sole and formed integrally therewith into a bandlike shape during molding of the sole and having at least a minimum of flexibility and resiliency. The toe cap section and the counter sections are formed integrally with the member 11. In some cases, the connecting member 11, toe cap section and counter section are formed of compounds of vinyl chloride resin, polyurethane resin or other thermoplastic or thermosetting resinous material. The side vamp sections 3' and the upper vamp section 4 are formed of more or less air-permeable natural or synthetic fiber (including fabrics thereof) and non-woven fabric, or other materials. They may be formed of natural or synthetic leather, or porous sheet or leather, and in some cases, formed of air-permeable synthetic resin.

However, sections 3', 4 are preferable formed of other materials with a necessary minimum of air-permeability.

As shown in FIGS. 7 and 8, the member 11 is formed of the same material with the sole. As understood from the molding step to be hereinafter presented, the member 11 is molded substantially I-shape in section and the same molten resinous material as used for the member 11 flows into a number of openings provided in the side vamp sections 3', and similarly into a number of openings 12 in the side vamp sections 3' or the upper vamp section 4, whereby adjacent sections, for example, the side vamp sections and the upper vamp section are inseparably connected by means of the member 11. However if the side vamp sections or the upper vamp section are formed of fibre material or others, in which molten resinous material easily flows into the meshes or eyelets of the texture, abovementioned openings 12 need not be provided.

The molding process is now described with reference to FIGS. 5 and 6. Illustrated therein is a mold 13 having a cavity 14 including a sole-forming chamber 15, a shape-retaining and connecting member-forming chamber 16 and spaces 17 for closely inserting the upper sections thereinto. The sole-forming chamber 15 and the member-forming chamber 16 communicate with each other to allow the flow of thermoplastic material thereinto from a supply duct. A lower section of the mold is supported by plungers actuated by suitable mechanical means (not shown) to move the same toward and away from the remaining portion of the mold. A core section also is removably supported by conventional suitable means (not shown). The upper sections of a shoe, that is, the side vamp sections 3' and the upper vamp section 4 are positioned in the spaces 17 in tight clamping relation. The size of each upper section is so defined that when positioned in the appropriate space the adjacent edges and/or edges adjacent to the sole protrude into the shape-retaining and connecting member forming chamber 16 and/or the sole-forming chamber 15. After positioning the upper sections and then closing the mold by injection molding process, vinyl chloride resin compound is injected from an injection molding apparatus (not shown) into the cavity 14 through the supply duct. The molten synthetic resin material thus injected into the cavity 14 is cooled and cured. The upper, which is formed by integrally connecting the upper sections to one another by means of the molded connecting member, and the sole integrally connected thereto provides a complete shoe. The connecting means and each of the upper sections may if desired be further connected together by machine-sewing stitching after welding.

The construction of the foamed inner layer and non-foamy outer layer of the sole also can be obtained in the abovementioned molding step, and such molding is performed according to conventional means known in the art.

In the abovementioned molding where the toe cap section, counter sections and side vamp sections are formed of vinyl chloride, polyurethane and other resinous material, only the upper vamp section is positioned into the space for inserting upper sections, and molten resin is injected into the cavity, whereby the top cap section, side vamp sections, the counter sections, the sole and connecting member are integrally formed, and at the same time, the upper vamp section is connected thereto.

A boot 18 shown in FIG. 9 has a similar construction to the shoes shown in FIGS. 4 to 8. The boot 18 comprises a sole 19 of the same construction as the abovementioned sole, the upper sections 20 and 21 forming the upper, are of the same construction as the abovementioned upper sections and a shape-retaining and connecting member 22 is of the same construction as the abovementioned member 11. The construction of boot 18 and molding process thereof are the same as abovementioned.

FIG. 10 illustrates molds for manufacturing a shoe as shown in FIG. 11. There are shown an upper 30 without an upper vamp section formed of synthetic leather or synthetic resin as mentioned above, a male mold 31, divided female molds 32A–32C and a bottom mold 33, said divided female molds 32A–32C and said bottom mold 33 defining a molding cavity 34, while the said male mold 31 and divided female molds 32A–32C are provided integrally with a plurality of cylindrical projections 35 and 36 throughout the whole periphery of the sections of the shoe.

In manufacturing a shoe, firstly an upper 30 is mounted on the male mold 31, and then the female mold 32C is pressed on the male mold 31 at 100 kg/cm² clamping pressure. Then the bottom mold 33, the female molds 32A and 32B are set in place, thereby the sole molding cavity 34 being defined. The lower peripheral edge 30a of the upper 30 supported by the male mold 31 and the female mold 32C is protruded into the molding cavity 34 and securedly supported at the outer and inner surfaces thereof by a plurality of projections 35 and 36. Each projection 35 has a cylindrical shape, extending integrally from the male mold 31 into the molding cavity 34 and being in contact with the inner surface of the lower peripheral edge 30a of the upper 30. Further, each projection 36 has a cylindrical shape similarly to the projection 35, extending integrally from the female molds 32A and 32B and being in contact with the outer surface of the lower peripheral edge 30a of the upper 30.

Then, sole molding material consisting of 100 parts of vinyl chloride resin, 70 parts of plasticizer (DOP), 0.5 part of smoothing agent (stearic acid) and 4 parts of coloring agent is injected under an injection pressure of about 60 kg/cm² for about one minute through an injection opening (not shown) into the molding cavity 34. In this case, the molds 31, 32A, 32B, 32C and 33 have a temperature of about 80° C. Then, the molds are cooled for about 30 seconds to about 50° C. By thus cooling the molds, the material in the molding cavity 34 is hardened, whereby a sole 37 is formed and at the same time said sole 37 and the upper 30 are integrally connected. Thus a sport shoe as shown in FIG. 11 is obtained. By means of the projection 35 and 36, through holes 38 are formed in the peripheral edge of the sole 37, and the upper surface consealed in the sole is partly exposed through the said through holes to represent an openwork. By coloring the upper 30 and the sole 37 is contrast to each other, colorful decoration is provided in addition to said openwork.

If a through opening is provided in the end portion 30a of the upper 30 protruded into the cavity, injected resin material on both sides of the end portion 30a are communicated through the opening with each other, thereby ensuring the connection. FIG. 13 illustrates an embodiment in which projections 35 and 36 are not in contact with but suitably spaced from the end portion 30a. In this case, only recesses are formed in the molded sole and the surface of the end portion 30a are not exposed.

An upper vamp section 39 as shown in FIG. 14 is formed of synthetic resin while in the drawing a top part of an upper vamp section is excluded therefrom for explanation. The lower peripheral edge of the upper vamp section 39 is adapted to be connected with a lateral side section having an insole which is to be provided later.

Figure 15:
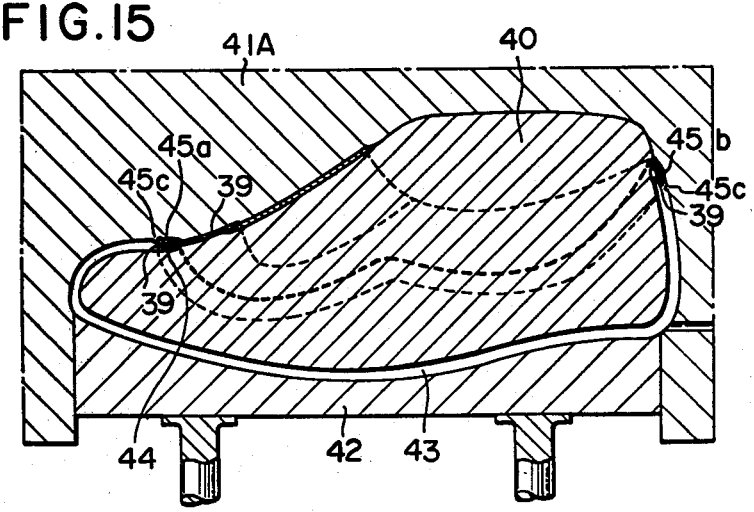
FIG. 15 is a longitudinal section of a mold assembly holding therein the upper of FIG. 14.
Figure 16:
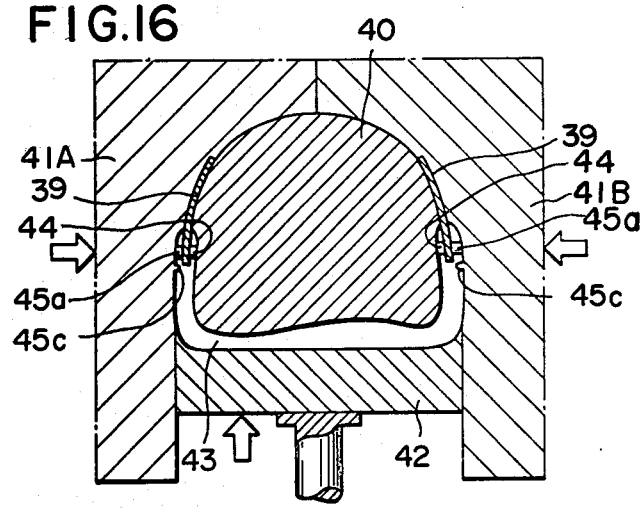
FIG. 16 is a cross section of the mold assembly of FIG. 15.

As shown in FIGS. 15 and 16, the upper vamp section 39 provided with the top part thereof is mounted on a male mold 40 and then female molds 41A and 41B are pressed on the male mold 40 at a clamping pressure of about 90 kg/cm² while a bottom mold 42 is put in place, whereby a cavity 43 for molding an insole and a lateral side section is defined by the molds 40, 41A, 41B and 42. The lower peripheral edge of the upper vamp section 39 are protruded into the molding cavity 43 (especially the part thereof for molding a lateral side section), and supportedly secured in a predetermined position by a number of projections 44, 45a and 45b extended from the male mold 40 and the female molds 41A and 41B into the molding cavity. The projections 44 and 45a have cylindrical shape of similar size. Each projection 45b has the same length with the projection 45a but a smaller diameter. Every two projections 45a, 45b are provided between projections 45a, 45b on the side of the female mold 41A and 41B as shown especially in FIG. 18. Further, the female molds 41A and 41B are provided with a linear projection 45C below the projections 45a and 45b.

After the upper vamp section 39 is put in place with respect to the molds as abovementioned, synthetic resin material of the similar composition to the sole molding material used above is injected under an injecting pressure of about 70 kg/cm² for about 1 minute through an injection opening. In this case, the molds 40, 41A, 41B and 42 have a temperature of about 90° C. Then the molds are cooled for 40 seconds to about 50° C. Removing the molds, a shoe as shown in FIG. 19 is obtained. In FIG. 19 are shown a lateral side section 50 connected to the lower peripheral edge of the preformed upper vamp section 39, and an insole 51 molded at the same time with the lateral side section 50. Further, there are shown a number of through holes 52a and 52b formed in the upper peripheral edge of the lateral side section 50 by means of the projections 45a and 45b respectively, and a groove 53 formed by the linear projection 45C. The outer surface of the lower peripheral edge portion of the upper vamp section 39 is partly exposed through the through holes 52a and 52b. Ordinarily, such a shoe manufactured as above is further provided with a sole 54 with an imaginary line. However, a preformed sole 54 may be connected to the insole 51 and the lower portion of the lateral side section 50 with an adhesive agent or by seaming. Otherwise, a sole may be molded by providing a sole molding cavity and at the same time the sole may be connected to an insole or a lateral side section.

FIG. 20 illustrates an example in which synthetic leather lining 55 is mounted over the male mold 40 prior to disposing the upper vamp section 39 thereon. In this case, projections 64 of the male mold 40 are in contact through the lining 55 with the lower peripheral edge of the upper vamp section 39.

Figure 21:
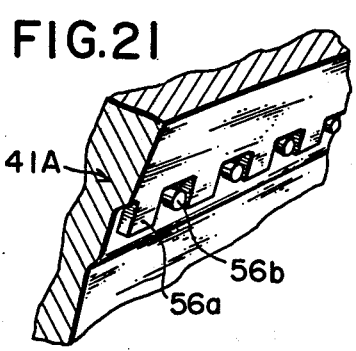
FIG. 21 is a perspective view of the main part of the mold assembly modified from the mold assembly in FIG. 20.
Figure 22:
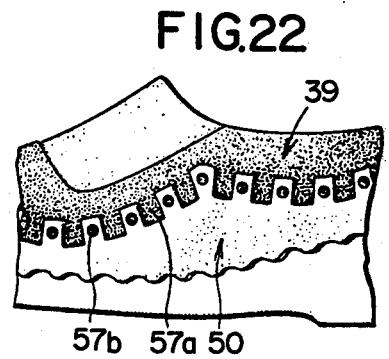
FIG. 22 is a partly enlarged front view of a shoe manufactured by the mold assembly of FIG. 21.
Figure 23:
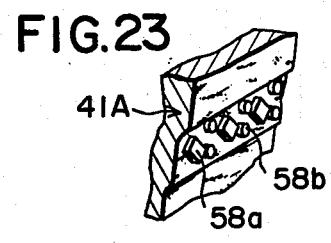
FIG. 23 and FIG. 24 are perspective views of parts of a mold assembly modified from the mold assembly in FIG. 21, respectively.
Figure 24:
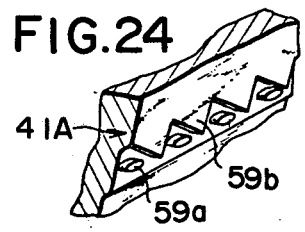

FIG. 21 illustrates a modification of the projections in a mold as shown in FIG. 18, in which the female mold 41A is provided with rectangular and circular sectioned projections 56a and 56b arranged in an alternative succession. By using such a female mold, the connecting part between the upper vamp section 39 and the lateral side section 50 is provided with a pattern of combination of sawtoothed line and circles formed by the through holes 57a and 57b as is in FIG. 22. FIG. 23 illustrates an example in which the female mold 41A is provided with rhombic projections 58a and circular projections 58b, while FIG. 24 illustrates another example in which the female mold 41A is provided with a wave shaped projection comprising a series of triangular projections 59b and elliptical projections 59a.

Figure 25:
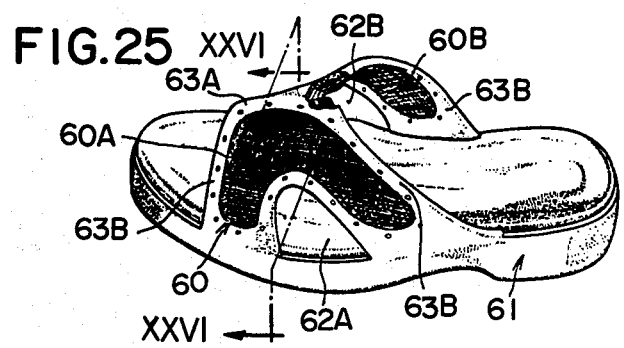
FIG. 25 is a perspective view of a sandal according to the present invention.
Figure 26:
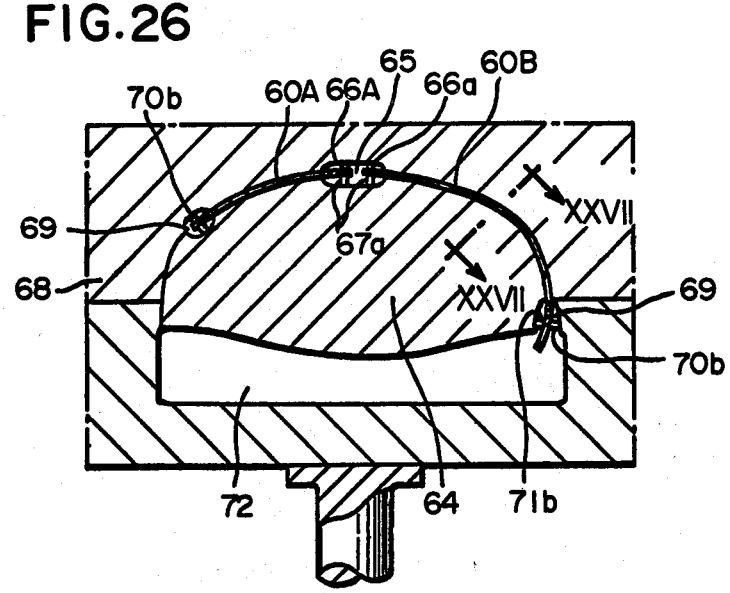
FIG. 26 is a cross section of a mold assembly for producing the sandal of FIG. 25.
Figure 27:
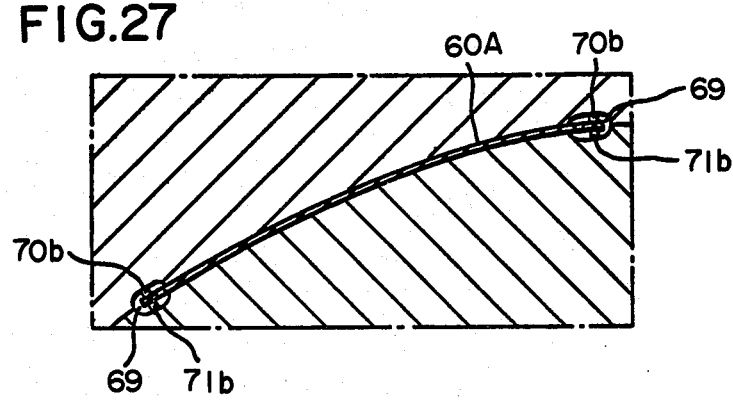
FIG. 27 is a sectional view taken along the line XXVII—XXVII in FIG. 26.

FIG. 25 illustrates a sandal manufactured by molds as shown in FIG. 26. The sandal comprises a band 60 consisting of band section elements 60A and 60B and a sole 61. The band section elements 60A and 60B are provided with cut-away portions 62A and 62B respectively and formed of porous woven cloth, leather, synthetic resin material or the like, the two elements 60A and 60B being integrally connected together at their adjacent margins in the center of the band by means of a connecting member 63A. The other end of each band section element is embedded into the sole 61. Further, the peripheral portion of each band section element is covered with flange members 63B. In manufacturing the sandal, as shown in FIG. 26, firstly the band section elements 60A and 60B are mounted on the male mold 64, one end of each band section element being inserted into a molding cavity 65 for molding a connecting member and supported between and by the projections 66a and 67a integrally protruded from a divided female mold 68 and the male mold. The peripheral margin of each band section element is inserted into a molding cavity 69 for molding a flange member and supported between and by the projections 70b and 71b. The other end of each band section element is protruded from the flange member molding cavity 69 into the sole molding cavity 72, the said end being also supported by the projections 70b and 71b. Preferably, the ends of the band section elements protruded into the connecting member molding cavity 65 and the flange member molding cavity 69 are provided with through holes. After the band 60 is put in place in the molding cavity, the said connecting member molding cavity 65, the flange member molding cavity 69 and the sole molding cavity 72 are filled by injection with synthetic resin material having a similar composition to that of the molding material used above. When the material is hardened, the band section elements 60A and 60B are connected with each other and at the same time the flange member is formed at the peripheral portion of the band section elements, the band 60 and the sole 61 being also integrally connected with each other.

In some case, the said projections and/or recesses are defined on the surface of the insole or the sole by applying thereto the same method with that in above. And if so, the following steps for defining the projections and/or recesses on the surface of the instep cover member or the others will be duly modified due to the structure of the insole or the sole, while no description therefor is specified in the following since the subject steps and structure is obvious to the skilled persons in the art and is duly included in the spirit and scope of the present invention.

According to the present invention, following methods are applied in order to ensure the coherence of the instep cover member, the instep cover section or the upper and the sole.

The method for ensuring the coherence according to the present invention is to define projections on the surface to be connected of the upper with sole or the other when the upper is molded. The projections defined on the surface to be connected of the upper permit a larger connecting area of the upper with the sole, and further ensure the stronger coherence than in the conventional method.

The shape and the dimension of each of the projection are properly deformable in consideration of the sort, the nature and the function of a footwear.

The projection of the surface to be connected of the upper are molded by one or more recesses at the corresponding portion of the female mold for an upper. The corresponding projection and/or recesses are defined on the surface to be connected of the upper after injecting synthetic resin material for an upper into, and molding and cooling the same within a molding chamber for an upper defined by the female mold for an upper.

It is more advantageous that the projections and/or the recesses is defined in a shape of a wedge, a dovetail or a hook thereby providing so-called a hooking portion or an engaging portion than that the projection and/or the recess is defined in a pillar shaped projection or groove thereby simply providing a larger contacting area.

Meanwhile, the projection or the recess is also allowed to be defined in one or more columns on the surface to be connected of the upper.

Further, a core is defined in the recess of the female mold for an upper in order to provide a hole through the projection defined on the surface to be connected of the upper so that the synthetic resin material for a sole flows into or passes through the hole when the sole is molded whereby the firm fixture of the upper with the sole is easily effected.

The above hole in the projection gives advantages in case that the projection defined on the surface to be connected of the upper is not provided with said hooked portion.

The footwear comprising the upper and the sole each molded with synthetic resin material may or may not have a lining. Especially in case of a footwear having a lining it is advantageous that on the surface to be connected of the upper is defined small holes penetrating through the whole thickness thereof. That is, the lining is desirable to be made of such material capable of being impregnated with molten synthetic resin material. The lining is placed in the molding cavity while being fit on a male mold for an upper, then the upper is molded within the cavity, and thereafter synthetic resin material for a sole is pressure-injected into the molding cavity whereby the pressed coherence of the upper with the sole is effected while the molten synthetic resin material reaches to the lining through the small holes.

The said resin material for a sole reaching to the lining of the upper permeates into a portion of the same near the recess so as to ensure a further firm coherence. In case that the lining is made of such material that the molten synthetic resin material may be hard to permeate therethrough, small holes are defined at corresponding portions of the lining, then the molten resin material for a sole is pressure-injected on molding the sole so that the resin material may reaches to the desired positions whereby the coherence of the upper with the sole is ensured.

Meanwhile, the molten resin material for molding the upper and the sole of the footwear is the conventional one obtained from the composition of plasticizer, lubricating agent, stabilizer, coloring agent, filling agent, blistering agent, and other additives with polyvinyl chloride resin, polyurethane resin or other resin as a main component. Further, when the upper and the sole are molded of the synthetic resin material, it is enough that at least a connecting portion of the upper to the sole is molded of the synthetic resin material.

Figure 28:
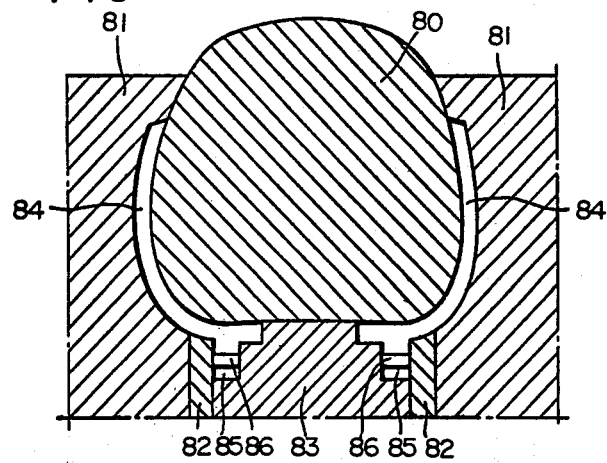
FIG. 28 is a cross section of a mold assembly for strengthening the connection of an upper and a sole of a shoe according to the present invention.

FIG. 28 shows a mold for molding an upper of a footwear wherein 80 is a male mold, 81, 82, 83 are divided female molds and 84 is a molding cavity for an upper.

Between the female molds 82, 83 is defined a space 85 longitudinally on the surface to be connected of the upper with a sole, said space 85 being communicated with the molding cavity 84 for an upper while a plurality of cores 86 are defined in the space 85.

Figure 29:
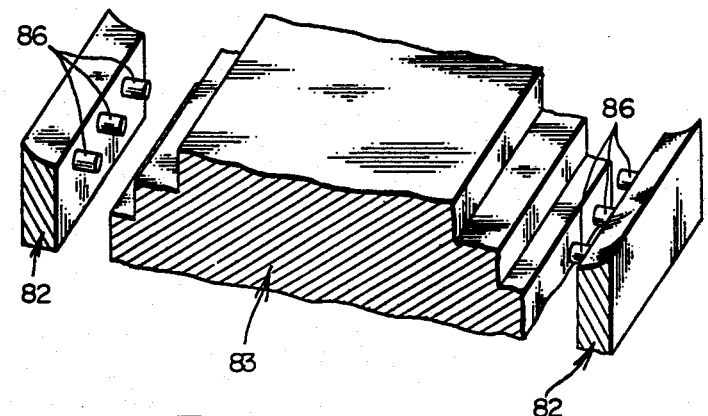
FIG. 29 is a partly enlarged and exploded view of the mold assembly in FIG. 28.

In FIG. 29, each of the cores 86 extends from the female mold 82 crossing the longitudinal axis of the space 85 to the female mold 83. Thermoplastic synthetic resin such as vinyl chloride resin composition is injected through an inlet (not shown in the figure).

Figure 30:
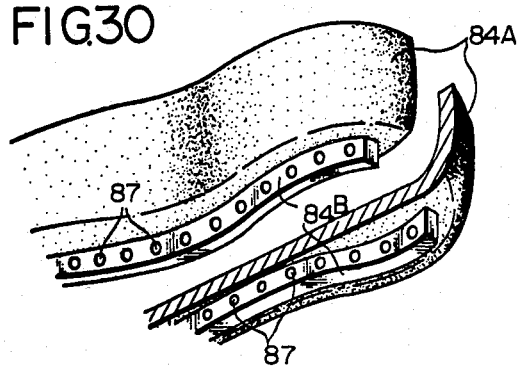
FIG. 30 is a perspective view of the partial lower portion of an upper produced by the mold assembly in FIG. 28.

After the molten resin material is cooled, the female molds 81 and 83 are at first removed, next the female mold 82 having the cores 86 is moved outwardly for extracting the cores 86 thereby forming an upper 84A and a connecting member 84B integral with the upper 84A being molded as shown in FIG. 30, while small through holes 87 are defined in the member 84B.

FIG. 31 shows how a sole is molded to the upper 84A provided with the member 84B. Thermoplastic synthetic resin material such as vinyl chloride resin composition is injected through an inlet into a molding cavity 90 for a sole defined by female molds 88 and 89 in order to pressure mold the sole. At this time, the injected molten resin material flows into each of the through holes 87 of the member 84B whereby the perfect integration of the member 84B with the sole is ensured.

Meanwhile, as shown in the subject example especially the shape retaining of the upper is effected by molding the member 84B longitudinally on the surface to be connected of the upper 84A. The FIG. 32 shows a modified mold in which an upper 91 provided with an insole is integrally connected with a sole in a molding cavity 92 for the sole.

Figure 33:
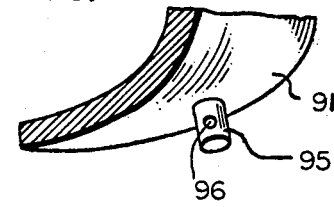
FIG. 33 is an enlarged perspective view of a projection protruded from an upper modified from those of the upper in FIG. 31.

In FIG. 33, from the surface to be connected of the upper 91 is protruded a cylindrical projection 95 provided with a small through hole. In FIG. 34, the projection 100 is provided with a global portion 98 and a small through hole 99. In FIG. 35, female molds 101 and 102 have recesses 97' each within which a core 103 is protruded from the female mold 101 to mold the projection 100.

FIG. 36 shows a mold for molding a connecting member of a wedge shape or a dovetail shape on the upper having an insole. On the divided female molds are defined recesses 104 and 105 of a wedge shape or a dovetail shape. The molten synthetic resin such as plastic vinyl chloride is injected into and molded within a molding cavity 106 for an upper having an insole, and the recesses 104 and 105, and thereafter female molds 108, 108 are outwardly removed from a male mold 17, then intermediate female molds 109, 109 are downwardly extracted and then female molds 110 and 111 at the both sides of the female molds 109, 109 are downwardly removed while being closed with each other. Thus, to an upper 106A being defined with a dovetail shaped connecting member 104A or a wedge shaped member 105A as shown in FIG. 37 are set female molds 112 and 113 for a sole so as to pressure mold the sole. The upper is perfectly locked with the sole by providing such connecting member of a wedge shape or a dovetail shape whereby the fixture of the both is extremely strengthened. There is no need of defining a through hole in the connecting member of a wedge shape or a dovetail shape, while a small through hole 114 can be defined, if necessary as shown in FIG. 38.

FIG. 39 show a mold for molding a connecting member of a hook shape (L-shape and T-shape) on the upper. On devided female molds are defined a T-shaped recess 115 and L-shaped recesses 116 and 117. The molten synthetic resin material such as vinyl chloride resin composition is injected into and molded within a molding cavity 118 for an upper having an insole and thereafter from a male mold 119 are extracted at first a female mold 120 upwardly, a female mold 121 outwardly and female molds 122, 123 and 124 downwardly so that female molds 125 and 126 can be easily removed, thus an upper 118A having T-shaped and L-shaped connecting members 115A, 116A and 117A as shown in FIG. 40 is obtained. Further, female molds 127 for a sole are set to the upper for molding a sole.

Figure 43:
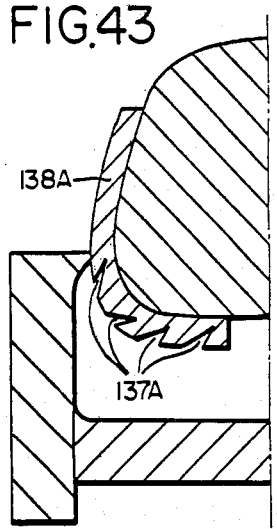
FIG. 43 is a cross section of the half part of a mold assembly for molding a sole set onto a molded upper modified from that in FIG. 39.
Figure 44:
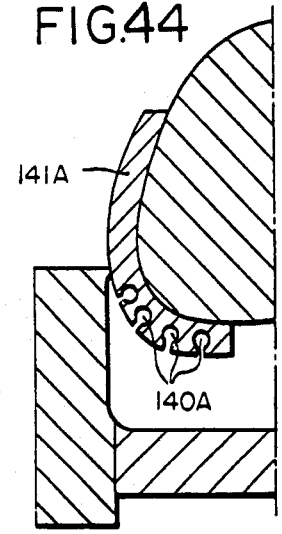
FIG. 44 is a cross section of the half part of a mold assembly for molding a sole set onto a molded upper modified from that in FIG. 39.
Figure 45:
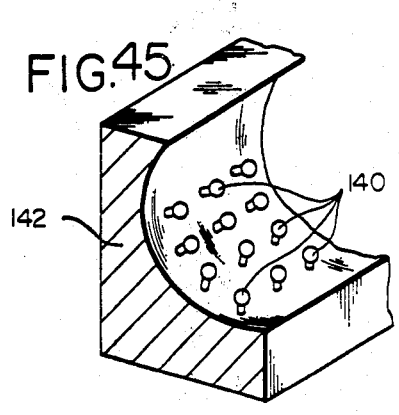
FIG. 45 is an enlarged perspective view of a part of a mold assembly for molding the upper in FIG. 44.

In FIG. 41, female molds 132 and 133 for a sole are set on an upper 131A having recesses 130A with hooked-shape (L-shape). FIG. 42 shows female molds 134, 135 and 136 for molding the upper. On the female molds 135 and 136 are mounted connecting members 130 for defining a recess, a top portion 130a of which is protruded from a root portion 130b thereof. FIG. 43 shows an example wherein an upper 138A has recesses 137A with a wedge shape. FIG. 44 shows an example wherein an upper 141A has recesses 140A of a mushroom shape. FIG. 45 shows a female mold 142 having projections 140 for forming the recesses 140A in FIG. 44. The female mold can be easily removed by utilizing resiliency owing to the expansion of the resin to be molded from the upper, instead of preparing many divided female molds when the recesses are molded.

Figure 46:
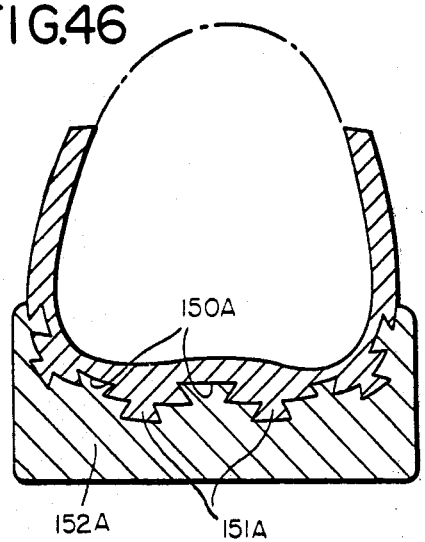
FIG. 46 is a cross section of a shoe produced by the mold assembly according to the present invention.

In FIG. 46, a sole 152A is firmly connected with an upper having an insole by recesses 150A, projections 151A of dovetail shapes and resin material molded therein and thereon.

FIG. 47 shows a section view of a footwear 156 wherein the coherence of a sole 155 with an upper 154 of the footwear having a lining 153 is strengthened by the method according to the present invention. The lining 153 is made of a material such as felt capable of being impregnated with the molten synthetic resin material therewithin at the same time of molding the footwear. The footwear 156 is manufactured by the following process. After the lining 153 is placed within a molding cavity by being fitted on a male mold, the upper 154 is molded within the molding cavity for an upper so that on the surface to be connected of the upper 154 are defined a plurality of small through holes 157 penetrating through the whole thickness thereof, and thereafter the sole 155 is molded within the molding cavity for a sole. During molding the sole, the molten synthetic resin material for a sole which has reached to the lining 153 through the holes 157 penetrates into the lining 153 (portions 158 of the lining) due to the injection pressure of the material and the impregnation of the lining 153 for the molten resin material. The sole 155 is not only pressure fixed to the surface to be connected of the upper 154 but also fixed to the lining 153 owing to the penetration of the synthetic resin material thereto, whereby the firm coherence of the upper 154 to the sole 155 can be effected.

FIG. 48 shows a footwear 163 wherein the coherence of an upper 161 with an sole 162 is strengthened when a lining 160 is applied thereto through which synthetic resin material is hard to penetrate. The method for molding the footwear 163 is the same with that for the footwear 156. The small holes 165 are previously defined on corresponding portions of the lining 160 to a plurality of holes 164.

When the molten synthetic resin material for a sole is pressure injected into the molding cavity for a sole, the resin material penetrates through the lining 160 and over the inside surface of the lining 160 as shown by numeral 166 through the holes 164 and the holes 165. The plurality of leakage portions 166 prevent a separation of the upper from the sole.

Figure 49:
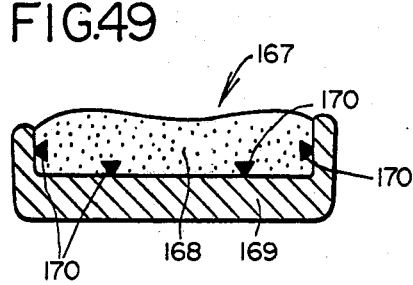
FIG. 49 is a cross section of the connection between an insole and a sole of a sandal according to the present invention.

FIG. 49 shows an inner sole 168 and a sole 169 of a sandal 167 being molded by the method of the present invention. The sandal 167 can be easily molded according to the subject method of the present invention. The sandal 167 can be molded of natural or synthetic leather instead of synthetic resin, in which slits 170 are previously defined on the surface to be connected of an insole.

As mentioned above, according to the present invention, the upper and sole of the footwear can be integrally and perfectly fixed with each other whereby the separation of the both is prevented in use with considerably violent movement of the foot.

EMBODEMENT 2

The subject embodiment is to explain how to manufacture a shoe 171 as shown in FIG. 50 and other shoes.

The shoe 171 comprises a sole made of synthetic resin 178 and an upper 177 consisting of an outer layer made of synthetic resin 172, an outer section 173, an upper base 174 and an upper vamp section 175. The outer section 173 is made of air permeable material such as natural leather, synthetic leather provided with small ventulation holes, natural fiber, or the like.

The upper base 174 consists of air-permeable non-woven fabric sheet sections connected to one another. FIGS. 51A, 51B and 51C show three sections to define the upper base. The sole section 475 (FIG. 52) corresponds to the substantial front half of a sole and has a cut away portion 176. However, said cut away portion 176 is not necessarily required, and the size of the sole section 475 is allowable to correspond to that of the whole sole.

The upper base 174 has the following 4 basic types by combination or application of said respective sections.
1. The type as shown in FIG. 52.
2. The type as shown in FIG. 53.
3. The type as shown in FIG. 54.
4. The type as shown in FIG. 55.

The said four types merely show the fundamental ones of the upper base 174, and the shape and size of the upper base 174 are changeable and modifiable. The outer layer of synthetic resin 172 is molded on the outer surface of said upper base 174.

In case that the upper base 174 is also suitable for a lining of shoe the lining will not be necessarily required, while a suitable material for a lining is adhered or seamed to the outer surface of the upper base 174 if necessary. In the subject example, lining 178 made of pile woven material being comfortable for touch is bonded to the non-woven fabric of the upper base 174 (FIG. 56).

Further, cushion members 181 may be bonded to the heel portion 179 and side portions of toe 180 of the upper base 174 as seen in FIG. 57. The said heel portion 179 and the side portions of toe 180 are the contacting portions between a foot and a shoe.

The outer section 173 is applied to the cut-away portion of the upper base 174 in FIG. 59.

To the upper base 174 in FIG. 52 the lining in FIG. 56 is applied.

FIG. 60 shows a shoe molding apparatus 200 according to the present invention. The apparatus 200 comprises mainly a male mold 201, divided female mold 202 for an upper and divided female mold 203 for a sole. Said divided female molds 202 and 203 are disposed upper and lower to each other with corresponding respective positions of a molding cavity 206 for an upper and a molding cavity 207 for a sole (the divided female molds 202 and 203 are opened in FIG. 60), while the male mold 201 is movable in position thereof corresponding to the respective positions of the molding cavities 206 and 207 which are defined by closing the dividing female molds 202 and 203.

The divided female mold 202 for an upper comprises a divided molds 208 and 209 which are laterally divided around an axis 210 while the divided female mold 203 for a sole comprises divided molds 211, 212 and 213. The divided molds 211 and 212 are laterally divided around an axis 214 while the divided mold 213 is fixed on a base 215. As mentioned above, the male mold 201 is adapted to locate at the predetermined position within the respective molding cavities 206 and 207 of the divided female molds 202 and 203 by being moved by means of a driving means through a last 204.

The male mold 201 is substantially lowered by means of the last 201 and arrives in the predetermined position within the upper molding cavity 206. The divided female molds 202 for an upper close to define the upper molding cavity 206 and thereafter molten synthetic resin material for molding an upper is pressure injected through an inlet 216 into the upper molding cavity 206. After the resin material is cooled or hardened, the divided female molds 202 for an upper is opened and then the male mold 201 on which an upper of synthetic resin 172 is molded is lowered up to the predetermined position within a sole molding cavity 207, and thereafter the divided female molds 203 for a sole close to define the sole molding cavity 207. Molten synthetic resin material for a sole is pressure injected through an inlet 217 into the sole molding cavity 207. After the molten resin material is hardened, the divided female molds 203 for a sole are opened and then the male mold 201 on which the upper of synthetic resin 172 and a sole are molded is moved by means of the last up to the upper part of the female molds 202 and 203. A molded shoe of synthetic resin is obtained by being demounted from the male mold 201.

As mentioned above, according to the apparatus 200 of the present invention, the divided female molds 202 for an upper, the divided female molds 203 for a sole, and the one male mold 201 corresponding to the female molds 202 and 203 are integrally constructed and are automatically controlled, whereby the capacity for manufacturing a shoe of synthetic resin is extremely improved. Furthermore, the upper molding cavity 206 and the sole molding cavity 207 are disposed up and down with each other.

Further, according to the present invention a shoe manufacturing apparatus 220 of rotary system is introduced wherein ten units of the shoe manufacturing apparatus 200 are cocentrically arranged in positions I-X in FIG. 61. The shoe manufacturing apparatus 220 of rotary system comprises mainly ten units of the shoe manufacturing apparatus 200, a driving means 221 for rotating the whole ten units of the shoe manufacturing apparatus 200 to the direction along the arrow, and injectors 222 and 223. The driving means is disposed at the lower part of a base.

The reason for arranging the ten units of the apparatus 200 is that the manufacturing process for the shoe in the subject embodiment consists of ten steps. The respective ten steps carry out respective predetermined works corresponding to the respective positions I-X of FIG. 61.

That is, according to the subject embodiment the ten steps corresponding to the respective positions I-X are as follows.

Position (I)—Step for mounting the upper base 174 on the male mold 201.

Position (II)—Step for forming the upper molding cavity 206.

Position (III)—Step for injecting molten synthetic resin material for the upper.

Position (IV)—Step for cooling the resin material.

Position (V)—Step for forming the sole molding cavity 207.

Position (VI)—Step for injecting the molten synthetic resin material for a sole.

Positions (VII, VIII, XI)—Step for cooling the resin material.

Position (X)—Step for removing the molded shoe.

At every time each step is completed, the whole ten apparatus 200 is revolved along the direction of the arrow of FIG. 61 by of FIG. 61 by a distance corresponding to one unit of apparatus and then the next step corresponding to each apparatus 200 is carried out.

Concrete steps for the subject are set forth below wherein the apparatus A represents the specific apparatus 200.

The manufacturing process for the shoe according to the present invention by use of the shoe manufacturing apparatus 220 of rotary system is as follows. The upper base 174 in FIG. 52 is mounted on the male mold 201 for a shoe in the shoe manufacturing apparatus A disposed at the position I of the shoe manufacturing apparatus 220 of rotary system in FIG. 61.

The whole ten units of the apparatus 200 is revolved along the direction of the arrow in FIG. 61 by means of the driving means of the driving means by a distance corresponding to one unit of the apparatus.

The apparatus A stops revolving at the position II in FIG. 61. The male mold 201 in the apparatus A is lowered by means of the last 204 up to the predetermined position within the open divided female molds for an upper 202 and thereafter the female molds 202 is closed to define the upper molding cavity 206. The apparatus 200 following the apparatus A stops rotating at the position I and carries out the step for mounting the upper base 174 on the male mold 201.

After the upper molding cavity 206 is formed, the whole ten units of the apparatus 200 is revolved by means of the driving means along the direction of the arrow in FIG. 61 by a distance corresponding to one unit of the apparatus.

The apparatus A stops revolving at the position III in FIG. 61. Molten synthetic resin material for an upper comprising the mixture of the following compositions is pressure injected into the upper molding cavity 206 of the apparatus A by means of the injecter 222.

The compositions for the synthetic resin material for an upper are set forth below.

| | | |
|---|---|---|
| PVC | 100 | Weight parts |
| DOP | 90 | |
| Stabilizer (Ba - Zn) | 4 | |
| Blowing agent | 4 | |
| Other additive | 2 | |

The above mixture is pressure injected into the cavity 206 of metal mold under the melting condition of 185° C. by the injection pressure of 30 kg/cm$^2$. The closing pressure for the divided female molds 202 for an upper is substantially 25 t/cm$^2$ while the temperature of the metal mold is approximately 35° C.

The apparatus A stops revolving at the position II of FIG. 61 and carries out the step for forming the upper molding cavity 206 at the position II. The apparatus A stops revolving at the position I and carries out the step for mounting the upper base 174 on the male mold 201.

The whole ten units of the apparatus 200 are revolved by means of the driving means along the direction of the arrow of FIG. 61 by a distance corresponding to one unit of the apparatus.

The apparatus A stops revolving at the position IV of FIG. 61 and carries out the step for cooling an outer layer of synthetic resin 172 which was injected for molding the outer layer at the position III. It is not necessary to cool the outer layer of synthetic resin 172 until the same is completely hardend while the same is left to be cooled for about 20-30 minutes under the closed condition.

In FIG. 62 is shown the upper 171 being hardend at the position IV. The upper 171 comprises the outer layer of synthetic resin 172 being molded on the periphery of the outer section 173 and on the outer surface of the upper base 174, and an insole 190 but not including the upper vamp section 175. The small holes 192 are defined on the upper 171 so that the upper vamp section 175 and the upper 171 are connected to each other through the holes 192. The holes 192 can be formed by corresponding projections on the female molds 202 for an upper within the cavity 206.

Further, the small holes 193 on the periphery of the outer section 173 are also formed by corresponding projections on the female molds 202 for the upper, whereby some decoration is effected on the outer surface of the upper 171. The projections on the female mold 202 for forming the holes 193 on the periphery of the outer section 173 of upper correspond to the periphery of the outer section 173 whereby the outer section 173 can be clumped with the male mold 201 for the upper.

Further, by forming the projections the upper base 174 can be clumped by the projections and by the male mold 201 for the upper and thereby to prevent the slippage of the upper base 174 within the upper molding cavity 206.

FIG. 63 shows the divided mold 208 of the divided female mold 202 for an upper in the subject embodiment of the shoe manufacturing apparatus 200. The inlet 216 for the molten synthetic resin material is mounted on the right end portion of the divided mold 208 while on the surface of the divided mold 208 are formed ducts 231, 232 and 233. The duct 231 tunnels from the point 234 through the divided mold 208 up to the point 235 of the upper molding cavity 206, through which points 235 is pressure injected the molten synthetic resin material. The duct 232 communicates to the toe 236 of the upper molding cavity 206, while the duct 233 communuicates to the rear portion 237 of the molding cavity 206, through which portion 237 is adapted to pressure inject the molten synthetic resin material within the molding cavity 206. Thus, the molten synthetic resin material is pressure injected into the molding cavity 206 through several parts so that the molten synthetic resin material is uniformly filled within the molding cavity 206.

Small projections 238 inside the molding cavity 206 is adapted to define the small holes 192 on the shoe upper 171 as shown in FIG. 62. Protruding portion 239 contacts with the outer section 173 for upper on the upper base 174 so as to prevent the outer layer of synthetic resin 172 from being molded on the outer section 173. Further, small projections 240 on the periphery of the protruding portion 239 contact with the periphery of the outer section 173. The small projections 238 and 240 and the protruding portion 239 contact with the upper base 174 mounted on the male mold 201 within the molding cavity 206 so that the upper base 174 can be clumped together with the male mold 201 so as to be prevented from the slippage thereof within the molding cavity 206.

The base portion of the upper molding cavity 206 is adapted to mold an insole. The projections 241 on the base portion of the molding cavity 206 having a nail-head-shaped section as shown in FIG. 64 may or may not contact with the upper base 174 being mounted on the male mold 201. Nail-head-shaped holes 301 can be formed on the outer layer 172 of synthetic resin by means of the nail-head-shaped projections 241 whereby the strong integral coherence of the sole 178 of synthetic resin with the outer layer 172 of synthetic resin of the upper is effected.

In FIG. 62 the outer layer synthetic resin 172 of the upper and the upper base 174 may be joined together by previous application of polyurethane adhesive to the upper base. However, during the molding step of the upper of synthetic resin, the molten synthetic resin material for the outer layer of the upper is impregnated with the surface of the upper base, so the upper base and the outer layer of resin were firmly connected to each other. During said molding the insole 190 is defined with the bottom thereof to be thereafter integrally connected with an outer sole 178 and there are formed a number of small holes 301 at the predetermined positions of said bottom corresponding to the said projections 241. Into the holes 301 the molten synthetic resin material for molding the sole 178 is injected by the injection pressure, so after hardening of said synthetic resin material between the upper of synthetic resin 172 and the sole of synthetic resin 178 can be ensured the strong coherence.

A band (connecting) member of resilient material connects a pair of protrusions 302, 302 of the upper to each other and the upper vamp section 175 is connected with the top edge of the upper 171 through small holes 192.

The molten synthetic resin material for molding the upper is directed onto the outer surface of the upper base 174 the periphery of the outer section 173.

FIG. 65 is the cross section of FIG. 62 and the insole 190 molded at the same time of molding the upper 172 has a plurality of big recesses 304 through reinforcing supporters 303 and onto said insole 190 is put a separately molded inner bed 305 of FIGS. 66A and 66B. Into some reinforcing 306 and 307 small metal members such as magnet members and others are put and they are adapted to give some slight stimulus to the wearer's foot sole by pressure in use together with small protrusions of the supporter 306 and they prevent the wearer's foot from slipping on the shoe in use. The said inner bed for insole 305 is molded of the compound material of metalic material and polyethylene, polypropylenenylon, ABS resin or the same kind of hard synthetic resin and has a lining as pile cloth. A plurality of protrusions 308 are integrally molded so as to protrude downwardly from the back surface of said inner bed are adapted to catch the reinforcing supporters. Further, the inner bed 305 has cut away portions 309 corresponding to said reinforcing supporters 303 and 306.

The reinforcing supporters 303, 306 and 307 and the recesses 304 are molded by the male mold 201. FIG. 67 shows the male mold for shoe 201. The subject male mold 201 is fixed to the last 204 so constructed as to slide vertically through a cylinder 250 by the conventional driving means (not shown). FIG. 68 shows the divided female molds for upper 202 of the shoe manufacturing apparatus of FIG. 60. FIG. 69 shows the divided female molds for sole 203 of the shoe manufacturing apparatus of FIG. 60. The divided female mold 203 consists of the divided molds 211, 212 and 213. The divided molds 211 and 212 are adapted to be divided into the right and left parts centering the axis 214, while the divided mold 213 is fixed to the predetermined position substantially perpendicularly below the male mold for shoe 201 and provided with an inlet 217 for injecting molten synthetic resin for sole at the top thereof. The molten synthetic resin material for sole pressure injected through said inlet 217 is homogeneously filled in the sole molding cavity 207 from 251 through the duct (not shown).

In FIG. 61, the respective shoe-manufacturing-apparatus 200 following after the A has stopped revolving at the position IV completes their respective working steps at the positions I–III.

In FIG. 61, at the position IV of the apparatus 220 of rotary system, the A completes the step for cooling the outer layer 172 of synthetic resin and thereafter the whole ten units of the apparatus 200 are rotated by means of the driving means along the direction of the arrow of FIG. 60 by the distance corresponding one unit of the apparatus.

The apparatus A stops revolving at the position V, where the female molds 202 are opened from each other, and thereafter transferring and fixing the male mold 201 for sole by means of the last 204 up to the predetermined position within the opened divided female molds 203 for sole so as to form the sole molding cavity 207 by closing the female molds 203 for sole.

Thereafter, the whole ten units of the apparatus 200 are revolved by means of the driving means along the direction of the arrow of FIG. 60 by a distance corresponding to one unit of the apparatus.

The apparatus stops revolving at the position VI, where into the sole molding cavity 207 is pressure injected by the injector 223 the molten synthetic resin material for sole comprising the following compositions.

| The synthetic resin material for sole | |
| --- | --- |
| P.V.C. | 100 weight parts |
| D.C.P. | 80 weight parts |
| Stabilizer (Ba-Zn) | 4 weight parts |
| Blowing agent | 4 weight parts |
| Other additives | 2 weight parts |

After the step for injecting the synthetic resin material for sole into the sole molding cavity 207, the whole ten units are revolved by means of the driving means along the direction of the arrow of FIG. 60 by a distance corresponding to one unit of the apparatus.

The apparatus A stops revolving at the position VII, where the apparatus A carries out the step for cooling the synthetic resin material for sole being injected within the sole molding cavity 207.

When the step for cooling the sole 178 of synthetic resin is carried out, it is necessary to fully cool the sole 178 of synthetic resin so that the same consists of inner blowing layer and outer non-blowing layer whereby the subject step need much times compared with that for the step at the positions I–VI. Therefore, the whole shoe-manufacturing-apparatus 220 of rotary system is adapted to be time-controlled so that while the cooling step is fully carried out at the positions VII, VIII and IX respectively, the shoe-manufacturing apparatus at the other positions may not be free from working.

Revolving operation of the shoe-manufacturing apparatus 220 of rotary system is further repeated so as to make the apparatus A carry out the cooling step at the positions VIII and IX.

Different coloring agents are used for the sole 178 of synthetic resin and for the outer layer 172 of synthetic resin of the upper, respectively, so as to result in two-color molding.

The synthetic resin material for sole is mixed with blowing agent so as to mold the sole 178 of synthetic resin into the inner blowing layer and the non-blowing layer completely surrounding the former layer. The boundary between the above layers may or may not be visible, while the structure of the cross section of the sole 178 of synthetic resin may be, from the outer surface toward the center thereof, such that the average cell diameter continuously increases from the non-blowing layer to the blowing layer.

The molten synthetic resin material is injected up to the upper base 174 through holes 301 within the sole molding cavity 207 so that the sole 178 of synthetic resin and the upper 171 are not only engageably fixed with each other but also pressure contacted with each other at the respective surfaces to be connected thereof, whereby the strong integral coherence of the sole 178 with the shoe upper 171 is effected. Meanwhile, it is also possible that the connection of the sole 178 with the upper 171 is obtained by decoratively seaming the said sole 178 and the upper 171 with thread.

The top surface of the sole 178 is integrally fixed onto the back surface of the insole 190.

After the apparatus A completes the cooling step at the position IX, the apparatus 220 of FIG. 61 is revolved by means of the driving means by a distance corresponding to one unit of the apparatus 200 whereby the apparatus A locates at the position X, where as mentioned above the molded shoe is removed from the apparatus A.

Thus, according to the present invention vertical movement of the male mold 201 for shoe of the shoe-manufacturing apparatus 200, opening and closing of the divided female molds for upper and sole, and revolution of the shoe-manufacturing apparatus 220 of rotary system are all automatically time-controlled so as to economize the labors, time and the others whereby the capacity for producing shoe of synthetic resin can be extremely improved.

After the molding of the sole 178 is completed, a pair of protrusions 302 is connected to each other by the band element of resilient material and thereafter the upper vamp section 175 made of air-permeable material such as natural leather, cloth and the like is fixed thereon by seaming with thread as shown in FIG. 50.

The peripheral band 176 made of cloth or natural leather is seamed with the above whereby the shoe 171 as shown in FIG. 50 is manufactured. It is also possible to manufacture a high-grade shoe of higher commercial value by coating on the shoe, if desired.

The shoe 350 in FIG. 70 comprises an upper including an outer layer members of synthetic resin 353, an upper base 354, an upper vamp section 355 and a sole of synthetic resin 352 of different composition from said outer layer members of synthetic resin, and on some portions of the outer surface of the upper base 354 as shown in FIG. 71 there are provided with some portions of the outer layer 353.

The upper base 354 is made of air-permeable material and suitable as an outer layer of a shoe upper, for example, natural or synthetic leather, cloth, fur, felt or suede. Suede is used for the subject embodiment.

As mentioned above, the upper base 354 per se is provided with air-permeation and adaptable for the outer layer of the upper 351, so that the outer layer of the shoe upper can be defined by a combination of different materials as shown in FIG. 70 by integrally molding the outer layer member of synthetic resin 353 on the required portions of the upper base 354 for the design, practical use, reinforcement and shape-retaining thereof, and it is not required that the outer layer member of synthetic resin 353 is molded onto the substantial whole surface of the upper base 354 as shown in FIG. 70. Further, it is possible that various designs can be formed on the surface of the upper 351 by designing the shape of the outer layer member of synthetic resin 353, so shoes of high commercial value can be manufactured.

Thus, in the shoe of the subject embodiment it is possible to previously cohere the outer layer member for upper 353 to the upper base 354 for improving decorative effect of shoe, if necessary.

The upper base 354 of suede does not require any lining, but for the more better feeling for foot a lining may be previously cohered to the upper base.

The shoe of FIG. 70 is manufactured by the shoe manufacturing apparatus of FIG. 60 or the shoe manufacturing apparatus of rotary system of FIG. 61. So, some methods only are shortly explained below.

Sheet sections of suede material are seamed together to form the upper base 354 of FIG. 71. Said upper base has almost the same shape with that 174 of FIG. 52, but there are some differences therebetween in that the upper base 354 is made of material capable to be used as the outer layer of the upper and the required number of through holes 369 passing through the upper base are provided at the required positions thereof onto which the outer layer members of synthetic resin 353 are to be molded.

The male mold for upper onto which the upper base is mounted within the upper molding cavity, the divided female molds for the upper are closed to define the upper molding cavity and the molten synthetic resin material of the following composition is pressure injected thereinto, whereby the outer layer members of synthetic resin 353 are molded onto the outer surface of the base 354.

Synthetic resin material for the upper;
Polyurethan resin (Isocyanate with the trademark "SUPRENE" of MITSUI TOATSU CHEMICALS, INC.)—100 weight parts
Polyol (Polyol with the trademark, "SUPRENE" 10P of MITSUI TOATSU CHEMICALS, INC.)—39 weight parts
   Stabilizer (Ba - Zn)—4 weight parts
   Blowing agent (azodicarboamide)—3 weight parts
   Lubricater (stearic acid)—2 weight parts
   Other additives Said molten resin material at the temperature of 190° C. is pressure injected into said molding cavity of mold under the injection pressure 35 kg/cm$^2$. The temperature of the mold rises up to around 35° C. After hardening of said molten resin material, said male mold with the upper base 354 having the outer layer members of synthetic resin is moved downwardly to the sole molding cavity.

The shoe upper is shown in FIG. 72. Said outer layer members of synthetic resin 353 are molded by injection on the toe cap section, the lateral side sections and the heel section of the upper base which contribute to reinforcement, shape retaining and design of the shoe upper 351. As shown in FIG. 72, the shoe 350 is given a design as sports shoe by molding the stripe-shaped outer layer members of synthetic resin 353'. The outer layer members of synthetic resin 353' is adaptable to be molded into any shape, and further the same after molding has much stable shape-retainability. Therefore, even in the upper base 354 made of material of poor shape-retainability such as suede and cloth, the outer layer members of synthetic resin 353 are molded onto the main parts of the upper base 354 such as the toe cap section, lateral side sections and heel section, whereby the shoe upper is provided with the superior shape-retainability. The various shapes of said upper of synthetic resin 353' can have various designs, sports shoes like design in the subject embodiment whereby manufactured shoes obtain the higher commercial value.

Small holes 363 of the top portion of the outer layer member of synthetic resin in FIG. 72 facilitate to seam therethrough the upper vamp section 355 with the outer layer member of synthetic resin 353 in FIG. 70, and are formed by providing with projections at the corresponding portions of the female molds for upper when molding the upper of synthetic resin.

The connection of the upper base 354 with the outer layer members 353' of synthetic resin can be obtained, as in the same way as above, by previously applying adhesive on the corresponding area of the upper base 354 to the outer layer members 353' of synthetic resin. In the subject embodiment, however, other than the said method, the tight connection therebetween is obtained in such way that during molding the outer layer members 353 of synthetic resin, the molten synthetic material is injected through holes 369 onto the upper base 354 and that the synthetic resin material penetrates through holes 369 into the inside of the upper base 354 as shown in FIG. 73 by the injection pressure within the upper molding cavity. After the molten synthetic resin is hardened, the upper base 354 can be clumped through holes 369 by the outer layer members 353 of synthetic resin on the outer surface of the upper base 354 whereby the stronger coherence between the upper base 354 and the outer layer members synthetic resin can be obtained. FIG. 73 shows how the outer layer members 353 of synthetic resin is fixed onto the upper base 354 without lining. In case of the upper base 354 with a lining 370, as shown in FIG. 74 there are provided with small holes at the corresponding portions of the lining 370 to the through holes 369 so as to ensure the coherence.

Further, an insole 364 is molded together during molding the outer layer members 353 of synthetic resin, the nail-head-shaped holes are mounted on the insole 364 as above thereby obtaining the firm integrarity of the outer layer members 353 of synthetic resin with the outer sole 352 which will be later molded.

The male mold mounted with the upper 351 of FIG. 72 thus molded is moved downwardly within the sole molding cavity, and thereafter the divided female molds for sole is closed to form the sole molding cavity and then the sole 352 is molded under injection pressure of the molten synthetic resin material for sole comprising the compositions set forth below.

| Synthetic Resin Material for Sole | |
| --- | --- |
| Vinyl chloride resin | 100 weight parts |
| Plasticizer (DOP) | 80 weight parts |
| Stabilizer (DF-14 manufactured by Adeca argus Co.) | 3 weight parts |
| Blowing agent (azodicarboamide) | 4 weight parts |
| Other additives | 3 weight parts |

The sole 352 comprises an inner blowing layer and an outer non-blowing layer and that the inner blowing layer is perfectly surrounded by the outer non-blowing layer. The boundary between said two layers may or may not be visible.

The coherence between the sole 352 and the outer layer members 353 of synthetic resin is obtained in the same way as above by the injection pressure as well as by the engaged fixture through the holes 365 of FIG. 72 so that the separation of the sole 352 from the upper 351 is to be prevented even after the long use of the shoe.

After the sole 352 is molded, the upper vamp section 355, the peripheral edge belt 366, the tang section 367 and the heel edge section 368 as shown in FIG. 70 are seamed together.

FIGS. 75, 76 and 77 show the other embodiments.

Each of shoes 371, 372 and 373 are manufactured substantially with the same way as in the shoe 350 in FIG. 70 while the shoe 371 of FIG. 75 is characterized in that not only the upper vamp section 375 but also the sole 374 are made of natural leather, the shoe 372 of FIG. 76 is characterized in that the sole 376 is molded of the synthetic resin material comprising the same compositions as that for the outer layer members 377 of synthetic resin, and the shoe 373 of FIG. 77 is characterized in that the upper 379 is molded of the same synthetic resin material with and at the same time with the outer layer members 378 of synthetic resin.

In FIG. 75, the upper base 380 of the shoe 371 is made of the air-permeable material and being applicable as an outer layer material for the upper 381, that is, the upper base 380 is made of a little thick fabric which is used for a footwear of the conventional sports shoe type. The sheet sections are seemed together so as to form the upper base 380. The upper base 380 is placed within the molding cavity for upper, and thereafter the outer layer members 382 of synthetic resin is molded onto the required portion of the upper base 380 by injecting the molten synthetic resin material. The outer layer members 382 of synthetic resin can provide the shape retainability and the reinforcement to the shoe 371 by molding the said members 382 in stripes comprising the toe cap section, the heel section, the peripheral edge section and the body section.

After the members 382 of synthetic resin is molded, the sole 374 of natural leather previously formed separately is firmly connected to the upper 381 with adhesive, and thereafter the upper vamp section 375, the tongue section 383, the peripheral edge 384 and the heel edge 385 are seamed on the upper 381 by machine.

In FIG. 76, the upper base 386 formed in the same way as the upper base 380 of the shoe 371 is placed in the molds which are provided with both the upper molding cavity and the sole molding cavity, and thereafter the outer layer members 377 of synthetic resin and the sole 376 of synthetic resin are integrally molded together of the same synthetic resin material. The compositions for the synthetic resin material for the shoe are set forth below.

| | |
|---|---|
| P.V.C. | 100 weight parts |
| D.O.P. | 70 weight parts |
| Stabilizer (OF-14 manufactured by Adeca argus Co.) | 3 weight parts |
| Blowing agent (azodicarboamido) | 3 weight parts |
| Lubricator (stearic acid) | 1 weight parts |
| Other additive | 2 weight parts |

After the sole 376 and the upper 377 are molded, the upper vamp section 388, the tongue section 389, the peripheral edge 390 and the heel edge 391 are seamed together.

In FIG. 77, the upper vamp section 379 of the shoe 373 is molded of the same resin material with that of the outer layer sections 378, so as shown in FIG. 78 the upper base 392 is further provided with an upper vamp portion 393 while on the center of the upper vamp portion 393 there is provided with a cut away portion 394. The cut away portion 394 may be only a slit. Meanwhile, a plurality of small through holes 395 are defined on required portions of the upper base 392 and the molten resin is injected up to the inner surface of the base 392 from the outer layer sections 378 through holes 395.

The outer layer sections 378 of synthetic resin and the sole 379 of synthetic resin are molded on the upper base 392 from the molten resin by the method according to the present invention and thereafter the tongue section 396, the peripheral edge 397 and the heel edge 398 are seamed therewith.

As seen from embodiments above, in some cases the upper is first molded in the cavity for molding the upper and thereafter the sole is molded integrally with the upper in the cavity for molding the sole, and thus the upper and the sole are molded together by the same male mold. In the other case, however, the sole is first molded in the cavity for the sole and thereafter the upper is molded integrally with the sole in the cavity for the upper. Further, in another case the upper and the sole are molded together in the same cavity. And also, the upper molded in the cavity is connected with the sole formed completely separating from the molding of the upper by sewing or adhering. The said methods are of course to fall within the scope of each of claims of the present invention. In FIGS. 73 and 74, numeral the outer layer members 353 are molded from the molten resin onto the outer surface of the upper base 354 made of air-permeable material such as natural leather, natural fabric and the like. In some case as shown in FIGS. 79 and 80, however, an upper base 354' is molded from the molten resin and an outer layer sections 353' is formed of air-permeable material such as natural leather, natural fabric and the like. Numeral 370' is a lining. Further, in another case the said outer layer sections 353' is to occupy the same space with that of the upper base 386 at the shoe 372 in FIG. 76 and the upper base 354' is also to occupy the same space with that of outer layer members 377 therein. Also, as shown in FIGS. 81 an outer layer sections 353' are molded of molten synthetic resin injected onto the upper base 354' and another outer layer sections 353" are molded of molten resin in the same cavity or respectively in the different cavities, or in the cavities communicated to each other, interposing the upper base 354' therebetween. Thus, sandwich like structure is obtained.

What I claim is:

1. A method for manufacturing footwear comprising opening divided female molds for an upper, mounting an upper base on a male mold, closing the divided female molds for the upper, injecting molten resin material for the upper into an upper molding cavity so as to mold outer layer members of synthetic resin onto an outer surface of said upper base, opening the divided female molds for the upper after cooling or hardening of the resin material, transferring said male mold to a predetermined position within divided female molds for a sole, closing said divided female molds for a sole, and injecting molten synthetic resin material for the sole into a sole molding cavity so as to mold a sole integrally with the upper.

2. A method for manufacturing an upper of a footwear as claimed in claim 1 including the step of molding outer layer members together with an insole on the male mold.

3. A method as claimed in claim 2 wherein recesses and protrusions are molded inside the insole by projections and recesses on the bottom of the male mold.

* * * * *